(12) United States Patent
Takeuchi et al.

(10) Patent No.: US 8,571,402 B2
(45) Date of Patent: Oct. 29, 2013

(54) IMAGE TRACKING DEVICE, IMAGING DEVICE, IMAGE TRACKING METHOD, AND IMAGING METHOD

(75) Inventors: Hiroshi Takeuchi, Tokyo (JP); Naoyuki Ohnishi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 486 days.

(21) Appl. No.: 12/289,378

(22) Filed: Oct. 27, 2008

(65) Prior Publication Data

US 2009/0109321 A1  Apr. 30, 2009

Related U.S. Application Data

(60) Provisional application No. 60/996,096, filed on Nov. 1, 2007.

(30) Foreign Application Priority Data

Oct. 31, 2007  (JP) ................. 2007-283310

(51) Int. Cl.
  *G03B 3/10*  (2006.01)
  *G03B 3/00*  (2006.01)
  *G03B 13/00*  (2006.01)
  *H04N 5/225*  (2006.01)

(52) U.S. Cl.
  USPC ............................. 396/95; 396/128; 348/169

(58) Field of Classification Search
  USPC ............. 348/345, 352, 349, 169; 396/95, 128
  See application file for complete search history.

(56) References Cited

U.S. PATENT DOCUMENTS 5,418,595 A * 5/1995 Iwasaki et al. ............... 396/95
5,619,300 A * 4/1997 Watanabe et al. ............ 396/95
7,079,188 B2 * 7/2006 Shiraishi et al. .............. 348/350
2004/0207743 A1 * 10/2004 Nozaki et al. ............ 348/333.12
2005/0162540 A1   7/2005 Yata

FOREIGN PATENT DOCUMENTS

| JP | A-01-287512 | 11/1989 |
| JP | A-7-110429 | 4/1995 |
| JP | A-08-075991 | 3/1996 |
| JP | A-08-075993 | 3/1996 |
| JP | A-10-068874 | 3/1998 |
| JP | A-2005-215040 | 8/2005 |
| JP | A-2007-034261 | 2/2007 |

(Continued)

OTHER PUBLICATIONS

Mar. 13, 2012 Office Action issued in Japanese Application No. 2007-283310, w/translation.

(Continued)

*Primary Examiner* — Clayton E Laballe
*Assistant Examiner* — Noam Reisner
(74) *Attorney, Agent, or Firm* — Oliff & Berridge, PLC

(57) ABSTRACT

An image tracking device comprises an image pickup device that takes an image formed by an imaging optical system and outputs image information, a focus detector that detects a focusing state of the imaging optical system, a recognizer that stores reference information related to a reference image and recognizes a position of an image corresponding to the reference information, within an image corresponding to the image information, and a controller that performs first focus detection in which the focusing state is detected by the focus detector, before the position is recognized by the recognizer, and second focus detection in which the focusing state is detected for the position that has been recognized by the recognizer.

13 Claims, 13 Drawing Sheets

(56) References Cited

FOREIGN PATENT DOCUMENTS

| | | |
|---|---|---|
| JP | A-2007-127923 | 5/2007 |
| JP | A-2007-178543 | 7/2007 |
| JP | A-2007-282188 | 10/2007 |

OTHER PUBLICATIONS

Dec. 25, 2012 Office Action issued in Japanese Patent Application No. 2007-283310 (with translation).

Sep. 3, 2013 Office Action issued in Japanese Patent Application No. 2007-283310 (with translation).

* cited by examiner

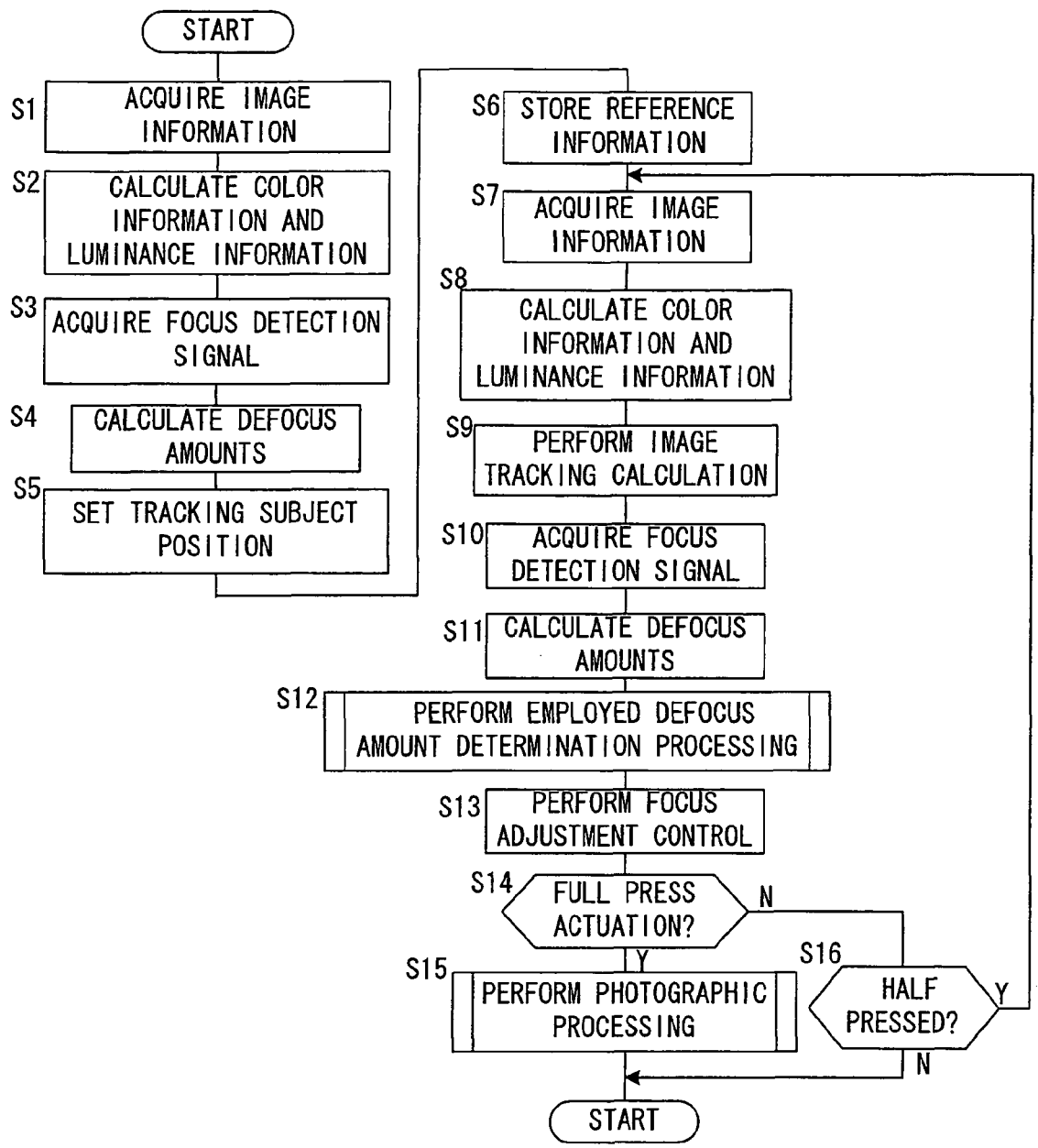

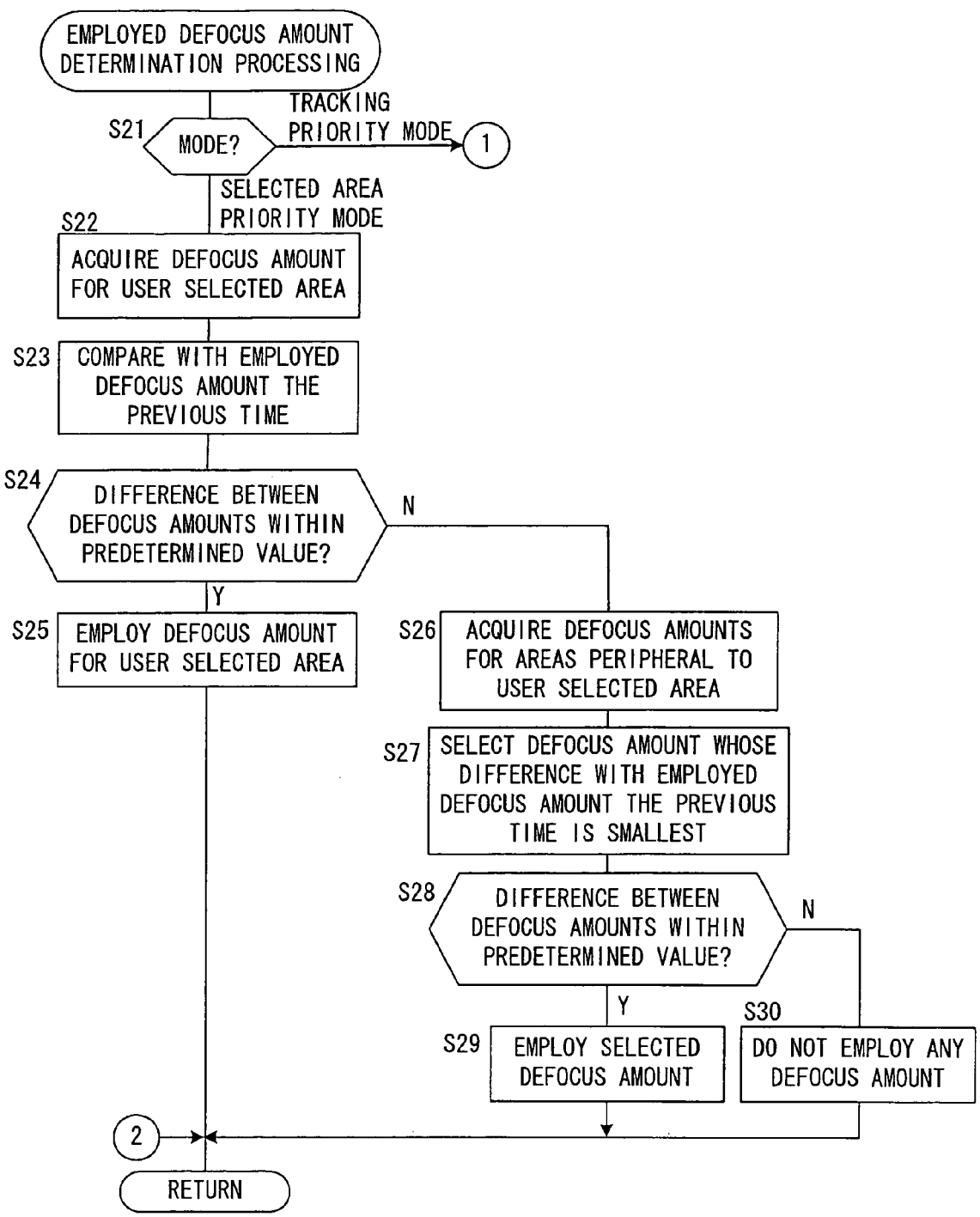

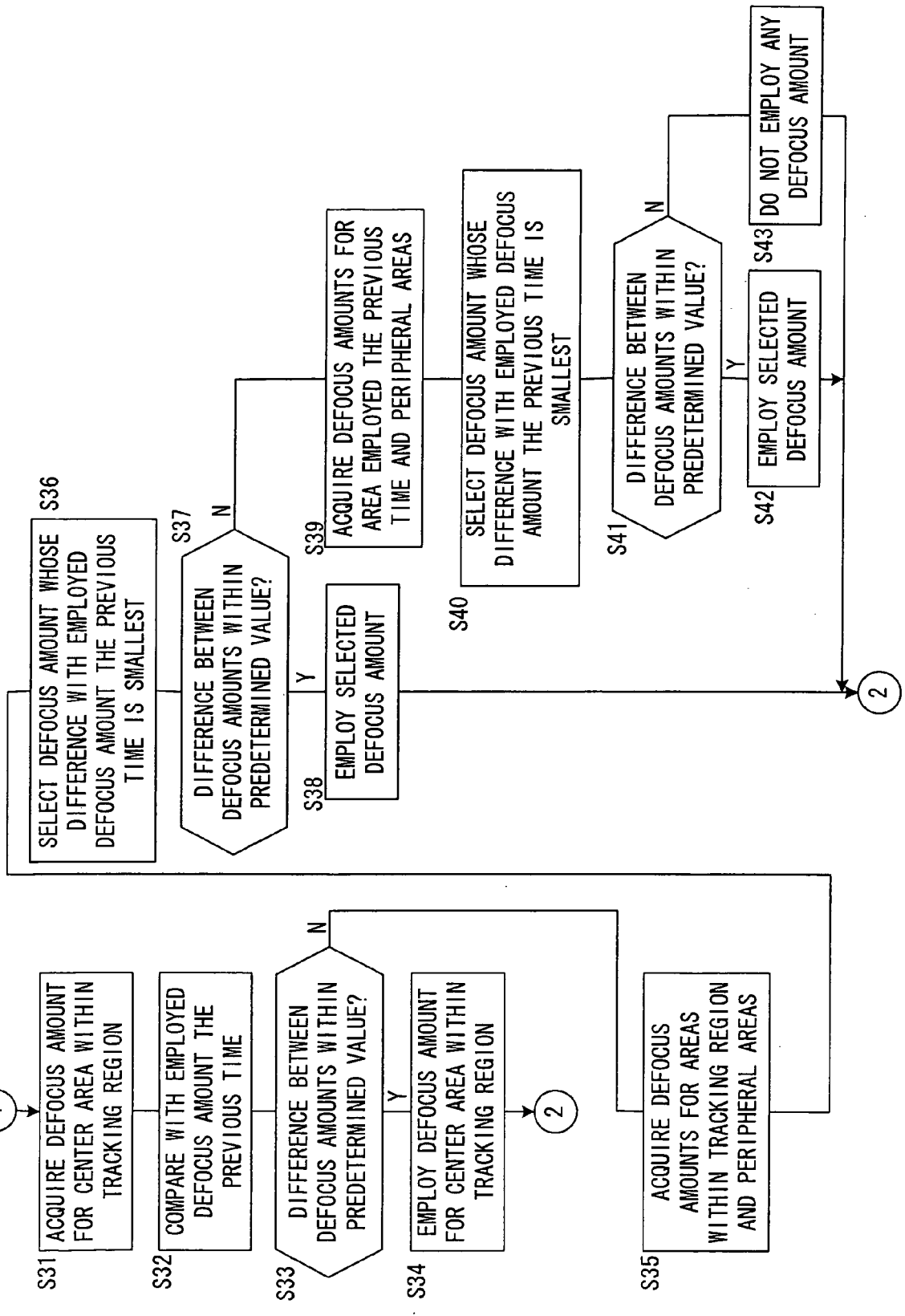

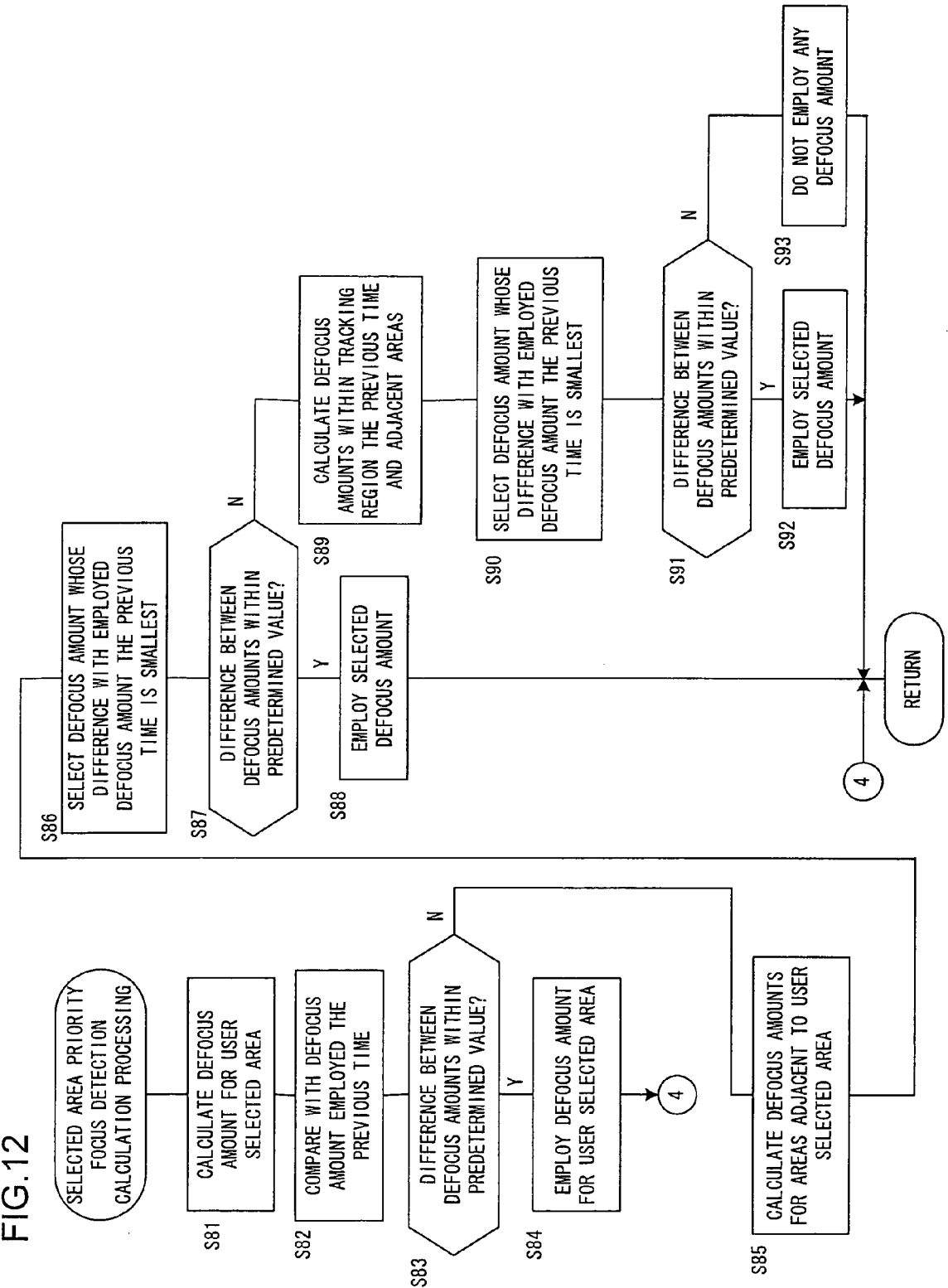

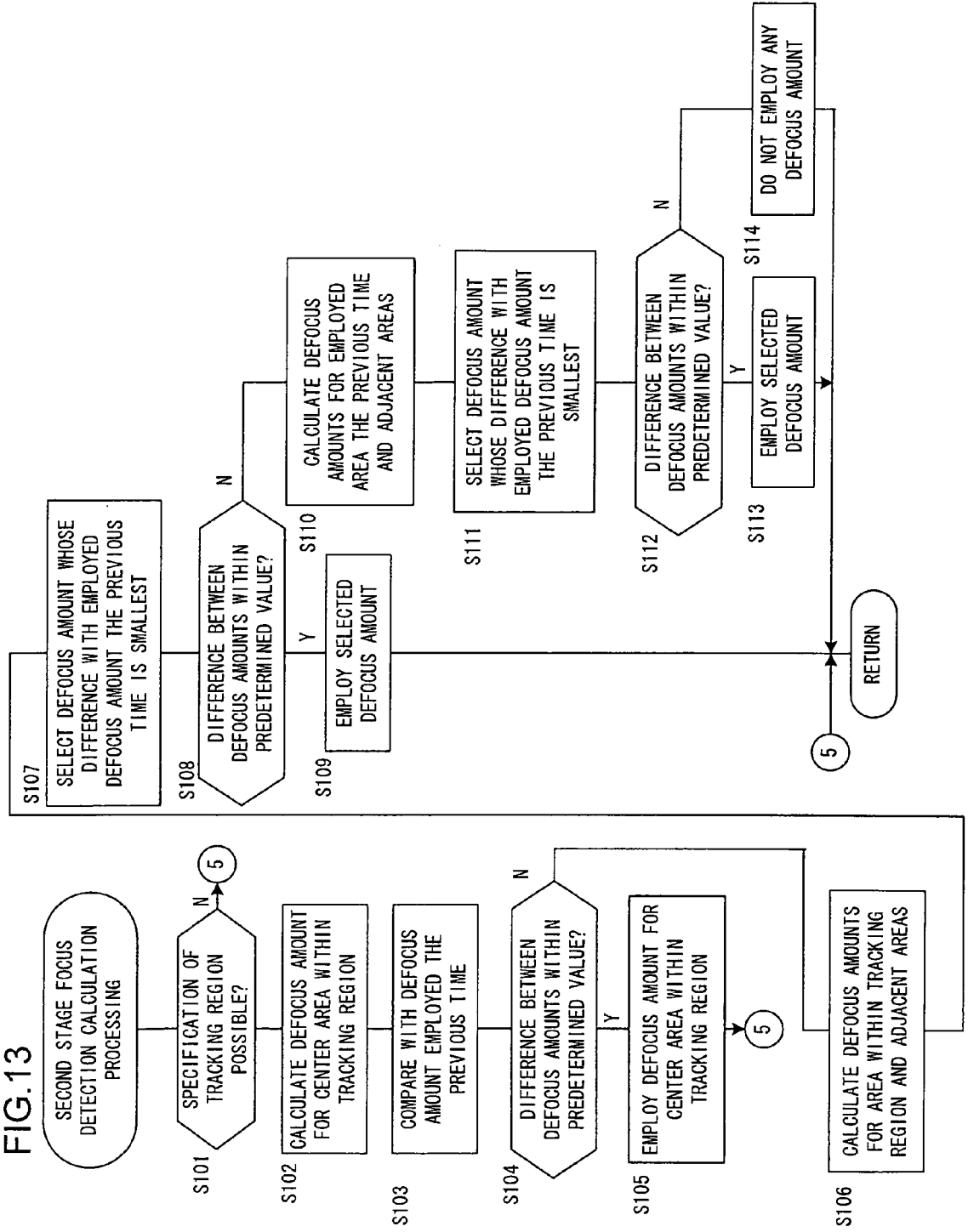

IMAGE TRACKING DEVICE, IMAGING DEVICE, IMAGE TRACKING METHOD, AND IMAGING METHOD

INCORPORATION BY REFERENCE

This non-provisional application claims the benefit of U.S. Provisional Application No. 60/996,096 filed Nov. 1, 2007. This application also claims priority from Japanese Application No. 2007-283310 filed Oct. 31, 2007. The disclosure of each of the earlier applications is incorporated herein by reference in its entirety.

BACKGROUND OF THE INVENTION

1. Field of the Invention

The present invention relates to an image tracking device, an imaging device, an image tracking method, and an imaging method.

2. Description of Related Art

The following type of auto focus system is known. In this auto focus system, there are provided an automatic focus adjustment (AF) function with which the defocus amounts of a photographic lens are obtained for a plurality of focus detection areas that are set within its photographic scene, and focus adjustment of the photographic lens is performed based upon the defocus amount of any one of these areas, and an image tracking function with which an image of a photographic subject within the photographed image that is to be the subject of tracking is stored as a template image (i.e. as a reference image), and then the photographic subject is tracked while searching, within images that are repeatedly captured, for positions in the images that are the same as, or that resemble, the template image. And a focus detection area is selected that corresponds to the position of the image tracking result, and the focal state of the photographic lens is adjusted according to the defocus amount of that focus detection area. (See Japanese Laid-Open Patent Publication No. 2005-215040.)

With the above described prior art auto focus system, it is not possible to start the focus detection calculation until the image information that is needed for calculation for tracking the photographic subject is obtained, since the focus detection calculation for the photographic lens is performed based upon the tracking calculation result for the photographic subject. Accordingly if the calculation processing time period for each photograph is limited, as for example during sequential shooting or the like, then it is not possible to perform efficient control within this limited calculation processing time period.

SUMMARY OF THE INVENTION

An image tracking device according to a first aspect of the present invention comprises an image pickup device that takes an image formed by an imaging optical system and outputs image information, a focus detector that detects a focusing state of the imaging optical system, a recognizer that stores reference information related to a reference image and recognizes a position of an image corresponding to the reference information, within an image corresponding to the image information, and a controller that performs first focus detection in which the focusing state is detected by the focus detector, before the position is recognized by the recognizer, and second focus detection in which the focusing state is detected for the position that has been recognized by the recognizer.

According to a second aspect of the present invention, in the image tracking device of the first aspect, the controller may perform the first focus detection and the second focus detection if a time period for taking the image by the image pickup device is longer than a predetermined time period.

According to a third aspect of the present invention, in the image tracking device of the first aspect, the controller can perform the first focus detection and the second focus detection if a luminance of the image is lower than a predetermined luminance.

According to a fourth aspect of the present invention, in the image tracking device of the first aspect, it is desirable that the focus detector detects the focusing state for a plurality of focus detection positions that are set to correspond to a plurality of positions within an image field of the imaging optical system, and the controller obtains the focusing state for a focus detection position, among the plurality of focus detection positions, that belongs to a region corresponding to the position recognized by the recognizer, when performing the second focus detection.

According to a fifth aspect of the present invention, in the image tracking device of the fourth aspect, it is more desirable that the controller unit obtains the focusing state for a focus detection position, among the plurality of focus detection positions, that has been selected in advance, when performing the first focus detection.

According to a sixth aspect of the present invention, in the image tracking device of the fifth aspect, the controller can take a focus detection position corresponding to the position that was recognized by the recognizer the previous time as being the focus detection position that has been selected in advance, and thereby obtains the focusing state, when performing the first focus detection.

According to a seventh aspect of the present invention, in the image tracking device of the fifth aspect, the controller may prevent the second focus detection for that focus detection position, among the plurality of focus detection positions, for which the focusing state was obtained when performing the first focus detection.

According to an eighth aspect of the present invention, in the image tracking device of the first aspect, the controller may prevent the second focus detection if recognition by the recognizer of the position of the image corresponding to the reference information has not been possible.

According to a ninth aspect of the present invention, the image tracking device of the first aspect may further comprise a selector that selectively sets a first mode in which the focusing state for the position recognized by the recognizer is employed as a priority as the focusing state detected by the first focus detection, and a second mode in which a focusing state for a specified focus detection position, among the plurality of focus detection positions, is employed. With this image tracking device, it is preferable that the controller prevents the second focus detection when the second mode is set.

An imaging device according to a tenth aspect of the present invention comprises the image tracking device and a focus adjuster that performs focus adjustment of the imaging optical system based upon the focusing state detected by the controller.

According to an eleventh aspect of the present invention, in the imaging device of the tenth aspect, the controller may perform the first focus detection and the second focus detection, when the image pickup device takes the image repeatedly a plurality of times.

According to a twelfth aspect of the present invention, in the imaging device of the eleventh aspect, the controller can perform the first focus detection and the second focus detection repeatedly at an interval between time periods at which the image pickup device takes the image.

According to a thirteenth aspect of the present invention, the imaging device of the eleventh aspect may further comprise a reflector that is disposed so as to be capable of being moved into and retracted out from an optical path of the imaging optical system, and that reflects light from the imaging optical system and conducts it to the focus detector. With this imaging device, it is preferable that the controller performs the first focus detection before the retraction of the reflector away from the optical path is started.

According to a fourteenth aspect of the present invention, the imaging device of the eleventh aspect may further comprise a reflector that is disposed so as to be capable of being moved into and retracted out from an optical path of the imaging optical system, and that reflects light from the imaging optical system and conducts it to the focus detector. With this imaging device, it is desirable that the controller performs the second focus detection after the retraction of the reflector away from the optical path has been started.

An image tracking method according to a fifteenth aspect of the present invention includes taking an image formed by an imaging optical system, outputting image information for the image, detecting a focusing state of the imaging optical system, storing reference information related to a reference image, recognizing a position of an image corresponding to the reference information, within an image corresponding to the image information, performing first focus detection in which the focusing state is detected, before recognition of the position is performed, and performing second focus detection in which the focusing state is detected for the position that has been recognized.

According to a sixteenth aspect of the present invention, in the image tracking method of the fifteenth aspect, the first focus detection and the second focus detection may be performed if a time period for taking the image is longer than a predetermined time period.

According to a seventeenth aspect of the present invention, in the image tracking method of the fifteenth aspect, the first focus detection and the second focus detection may be performed if a luminance of the image is lower than a predetermined luminance.

According to an eighteenth aspect of the present invention, in the image tracking method of the fifteenth aspect, it is desirable that the focusing state is detected for a plurality of focus detection positions that are set to correspond to a plurality of positions within an image field of the imaging optical system, and that, when the second focus detection is performed, the focusing state is obtained for a focus detection position, among the plurality of focus detection positions, that belongs to a region corresponding to the position that has been recognized.

According to a nineteenth aspect of the present invention, in the image tracking method of the eighteenth aspect, it is preferable that, when the first focus detection is performed, the focusing state is obtained for a focus detection position, among the plurality of focus detection positions, that has been selected in advance.

According to a twentieth aspect of the present invention, in the image tracking method of the nineteenth aspect, it is more preferable that, when the first focus detection is performed, a focus detection position corresponding to the position that was recognized the previous time is taken as being the focus detection position that has been selected in advance, and thereby the focusing state is obtained.

According to a 21st aspect of the present invention, in the image tracking method of the nineteenth aspect, the second focus detection may be prevented for that focus detection position, among the plurality of focus detection positions, for which the focusing state was obtained when the first focus detection is performed.

According to a 22nd aspect of the present invention, in the image tracking method of the fifteenth aspect, the second focus detection may be prevented if recognition of the position of the image corresponding to the reference information has not been possible.

According to a 23rd aspect of the present invention, the image tracking method of the fifteenth aspect may further include setting selectively a first mode in which the focusing state for the recognized position is employed as a priority as the focusing state detected by the first focus detection, and a second mode in which a focusing state for a specified focus detection position, among the plurality of focus detection positions, is employed. With this image tracking method, it is desirable that the second focus detection is prevented when the second mode is set.

An imaging method according to a 24th aspect of the present invention includes taking an image formed by an imaging optical system, outputting image information for the image detecting a focusing state of the imaging optical system, storing reference information related to a reference image, recognizing a position of an image corresponding to the reference information, within an image corresponding to the image information, performing first focus detection in which the focusing state is detected, before recognition of the position is performed, performing second focus detection in which the focusing state is detected for the position that has been recognized, and performing focus adjustment of the imaging optical system based upon the focusing state that has been detected.

According to a 25th aspect of the present invention, in the imaging method of the 24th aspect, the first focus detection and the second focus detection may be performed when the image is repeatedly taken a plurality of times.

According to a 26th aspect of the present invention, in the imaging method of the 25th aspect, the first focus detection and the second focus detection may be performed repeatedly at an interval between time periods at which the image is taken.

According to a 27th aspect of the present invention, the imaging method of the 25th aspect may further include disposing a reflector that reflects light from the imaging optical system in order to perform detection of the focusing state within an optical path of the imaging optical system, and also retracting it away from the optical path. With this imaging method, it is preferable that the first focus detection is performed before the retraction of the reflector away from the optical path is started.

According to a 28th aspect of the present invention, the imaging method of the 25th aspect may further include disposing a reflector that reflects light from the imaging optical system in order to perform detection of the focusing state within an optical path of the imaging optical system, and also retracting it away from the optical path. With this imaging method, it is preferable that the second focus detection is performed after the retraction of the reflector away from the optical path has been started.

BRIEF DESCRIPTION OF THE DRAWINGS

FIG. 8 is a flow chart showing the flow of photographic subject tracking processing, in this embodiment;

FIG. 9 is a flow chart showing the flow of defocus amount determination processing employed during the execution of this photographic subject tracking processing;

FIG. 10 is a flow chart following on from FIG. 9, showing the further flow of this defocus amount determination processing that is employed;

FIG. 12 is a flowchart showing the flow of selected area priority focus detection calculation processing that is executed by the photographic processing; and FIG. 13 is a flow chart showing the flow of second stage focus detection calculation processing that is executed by the photographic processing.

DESCRIPTION OF THE PREFERRED EMBODIMENT

An image tracking device according to an embodiment of the present invention will now be explained in the following. The image tracking device of this embodiment stores reference information related to an image that is to be taken as a reference, takes an image created by an imaging optical system, and outputs image information. And, in the image that corresponds to the image information, an image that corresponds to the reference information is taken as a subject, and the position of this subject image within the photographic scene is recognized and is tracked. At this time, it is arranged to detect the focusing state of the imaging optical system before recognizing the position of the subject image, and, after having recognized the position of the subject image, to detect the focusing state of the imaging optical system for this position.

Figure 1:
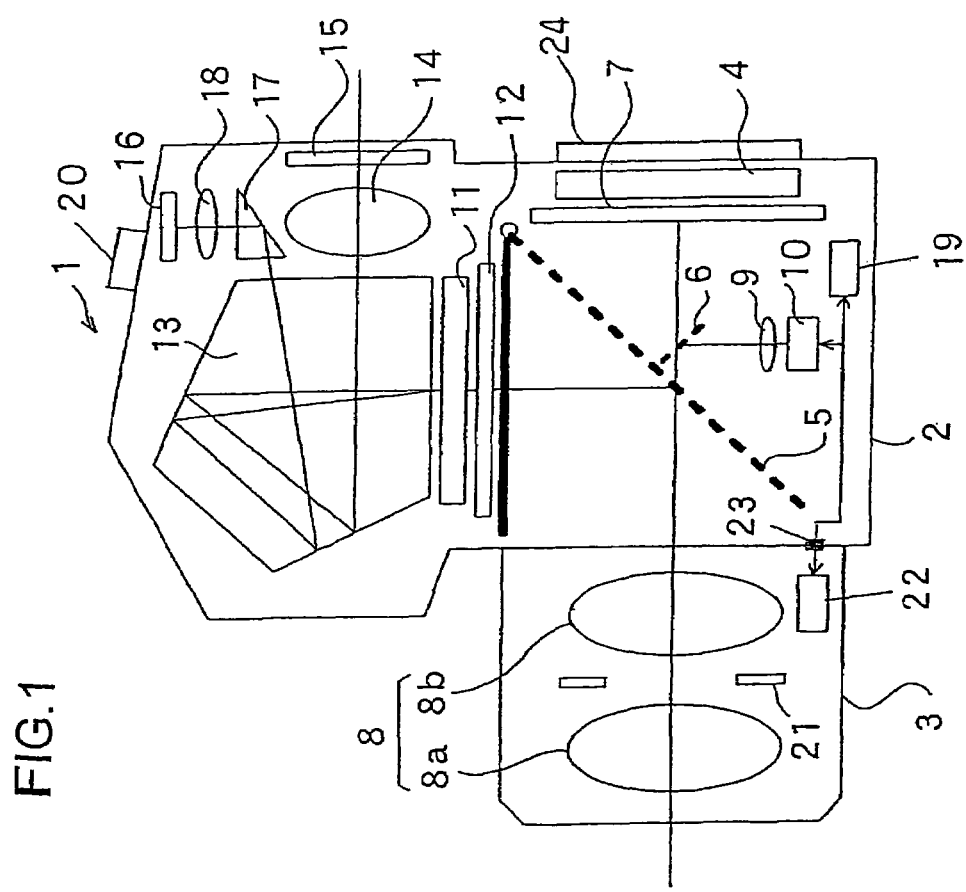
FIG. 1 is a figure showing the structure of an imaging device including an image tracking device according to an embodiment of the present invention.

FIG. 1 is a figure showing the structure of an imaging device 1 (a single lens reflex digital still camera) that includes an image tracking device according to an embodiment of the present invention. It should be understood that, in FIG. 1, explanation is omitted devices and circuitry of the camera that have no direct relationship with the invention of the present application. With the camera 1 of this embodiment, an interchangeable lens 3 can be detachably fitted to the camera main body 2. This interchangeable lens 3 includes a photographic lens 8, that is an imaging optical system. The photographic lens 8 includes a zooming lens 8a and a focusing lens 8b.

A first image sensor 4 for taking an image of a photographic subject and recording a photographic image is provided to the camera main body 2. This first image sensor 4 may be constituted by, for example, a CCD or a CMOS or the like. During photography, a quick return mirror 5 and a sub-mirror 6 are retracted to positions shown by a solid line away from the photographic optical path, a shutter 7 is opened, and an image of the photographic subject is imaged by the photographic lens 8 upon the light reception surface of the first image sensor 4.

A focus detection optical system 9 and a range-finding element 10 are provided at the bottom portion of the camera main body 2, for detecting the focusing state of the photographic lens 8. In this embodiment, an example is shown in which the method of focus detection by split pupil phase difference is employed. The focus detection optical system 9 conducts a pair of ray bundles for focus detection that have passed through the photographic lens 8 to the light reception surface of the range-finding element 10, thus causing a pair of optical images to be imaged thereupon. The range-finding element 10 may, for example, include a pair of CCD line sensors, and may output a focus detection signal corresponding to a pair of optical images. Before photography, the quick return mirror 5 and the sub-mirror 6 are set to a position within the photographic optical path, as shown by the broken line. At this time, the pair of ray bundles for focus detection from the photographic lens 8 pass through a half mirror portion of the quick return mirror 5, and are reflected by the sub-mirror 6 and conducted to the focus detection optical system 9 and the range-finding element 10.

A viewfinder optical system is provided at the upper portion of the camera main body 2. Before photography, the quick return mirror 5 and the sub-mirror 6 are positioned as shown by the broken line. At this time, the photographic subject light from the photographic lens 8 is reflected by the quick return mirror 5 and is conducted to a focus plate 11, and thereby an image of the photographic subject is imaged upon the focus plate 11. A liquid crystal display element 12 not only displays focus area detection marks and the like as superimposed over the image of the photographic subject that has been imaged upon the focus plate 11, but also displays various types of photographic information such as an exposure value and the like at positions that are remote from the image of the photographic subject. The image of the photographic subject upon the focus plate 11 is conducted to an eyepiece window 15 via a roof pentaprism 13 and an eyepiece lens 14. Due to this, the photographer is able visually to check the image of the photographic subject.

Furthermore a second image sensor 16, that takes an image of the photographic subject for photographic subject tracking and for photometry, is provided to the viewfinder optical system at the upper portion of the camera main body 2. Before photography, the image of the photographic subject created by the photographic lens 8 that is imaged upon the focus plate 11 is re-formed onto the light reception surface of this second image sensor 16, via the roof pentaprism 13, a prism 17, and an imaging lens 18. The second image sensor takes this image of the photographic subject, and outputs the resulting image information. Although this will be described in more detail herein after, image tracking control and exposure control are performed based upon the image information that is outputted from this second image sensor 16.

Furthermore a body control device 19, actuation members 20 and the like are provided to the camera main body 2. The body control device 19 consists of a microcomputer that will be described in detail hereinafter and a memory, an A/D converter and the like, and performs various types of control and calculation for the camera 1. The actuation members 20 are various types of switches and selectors for actuation of the camera 1. For example, a shutter release button, a focus detection area selection switch, a photographic mode selection switch, a focus adjustment mode selection switch and the like are included in the actuation members 20.

A zooming lens 8a, a focusing lens 8b, an aperture 21, a lens control device 22 and the like are provided to the interchangeable lens 3. It should be understood that although, in this embodiment, the photographic lens 8 is shown as including the zooming lens 8a and the focusing lens 8b, the structure of the photographic lens 8 is not limited to the structure shown in FIG. 1. The lens control device 22 consists of a microcomputer and peripheral elements such as a memory, drive circuitry, actuators, sensors and the like, not shown in the figures. The lens control device 22 performs drive control of the lenses 8a and 8b and the aperture 21 and detection of their positions, and outputs information specifying the focal distance of the interchangeable lens 3 and its open aperture value and the like.

The body control device 19 and the lens control device 22 perform mutual communication via contact points 23 of the lens mounting portion. Information specifying a lens drive amount and an aperture control value and the like is transmitted from the body control device 19 to the lens control device 22. On the other hand, information specifying the focal distance of the zooming lens 8a, the photographic distance of the focusing lens 8b, the aperture value and the like is transmitted from the lens control device 22 to the body control device 19. A monitor 24 is provided upon the rear surface of the camera main body 2, and displays not only through images and photographed images, but also various type of photographic information.

Figure 2:
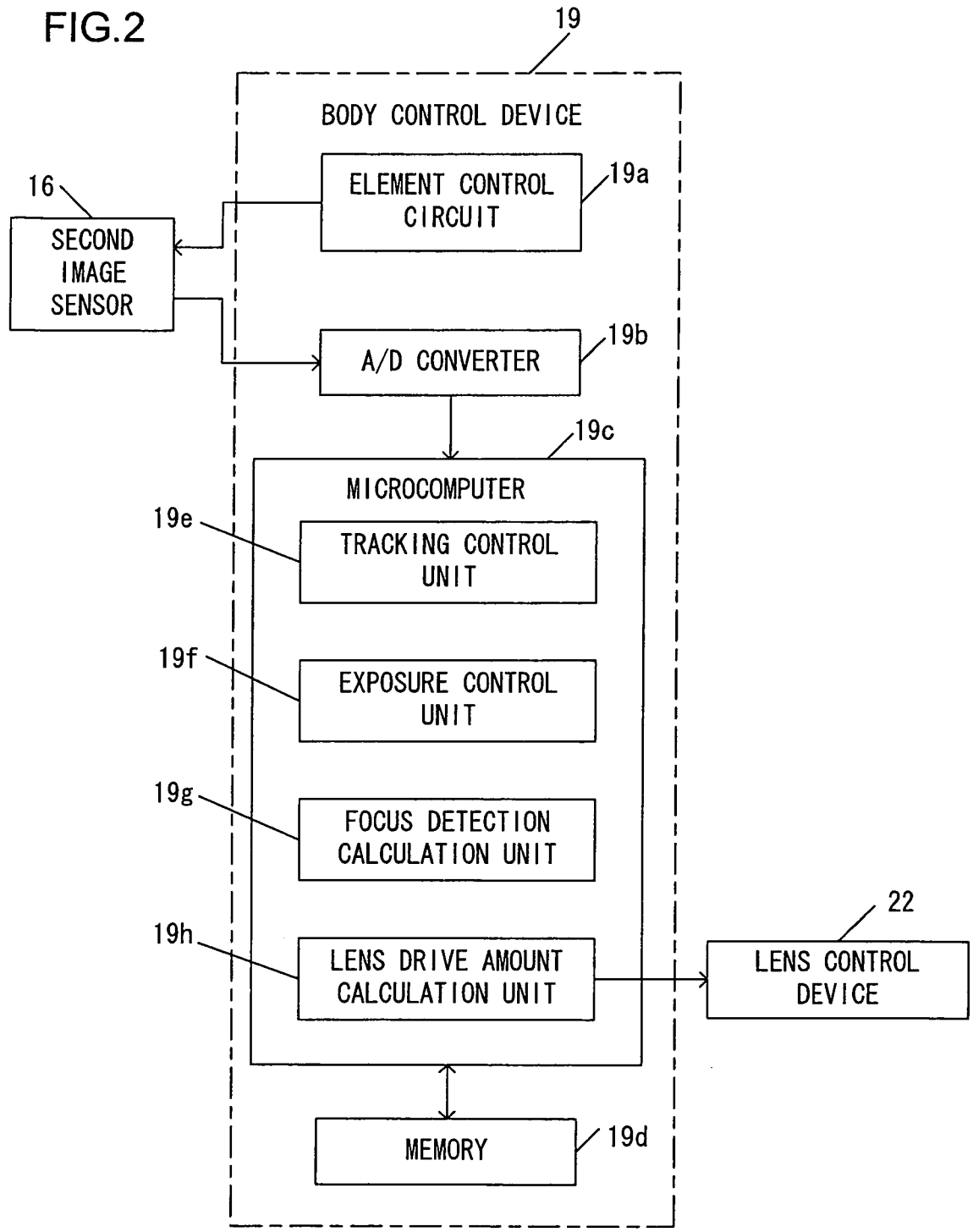
FIG. 2 is a figure showing the detailed structure of a body control device.

FIG. 2 shows the detailed structure of the body control device 19. It should be understood that explanation is omitted of control functions that have no direct relationship with the invention of the present application. The body control device includes an element control circuit 19a, an A/D converter 19b, a microcomputer 19c, a memory 19d, and the like. The element control circuit 19a controls accumulation and reading out of the electric charges of the second image sensor 16. The A/D converter 19b converts an analog image signal that is outputted from the second image sensor 16 as image information into a digital image signal. The microcomputer 19c includes, in the form of software, a tracking control unit 19e, an exposure control unit 19f, a focus detection calculation unit 19g, and a lens drive amount calculation unit 19h. The memory 19d stores information specifying a template image for image tracking as reference information related to an image that is taken as a reference during image tracking.

The tracking control unit 19e sets, as a template image, an image of a portion, in the image represented by the image information obtained by the second image sensor 16 as it captures the image of the photographic subject, that corresponds to a set position. It should be understood that the method for setting this tracking subject position will be explained in detail hereinafter. The information for this template image is stored by the memory 19d as reference information. Subsequently, based upon the image information outputted repeatedly at predetermined time intervals from the second image sensor 16, and upon the reference information stored in the memory 19d, the tracking control unit 19e further recognizes the portion in the image given by the reference information that is equivalent to the reference information, in other words the position of the portion in the image that agrees with or resembles the template image, thus performing tracking. This type of image tracking processing is repeatedly performed by the tracking control unit 19e.

The exposure control unit 19f calculates an exposure value during photography based upon the image information that is outputted from the second image sensor 16. This exposure value that is obtained by the exposure control unit 19f, along with being outputted to the lens control device 22 and being used for drive control of the aperture 21, also is used for control of the shutter 7.

Based upon a focus detection signal outputted from the range-finding element 10 according to its pair of optical images, the focus detection calculation unit 19g detects the focusing state of the photographic lens 8 by a well known phase difference detection method or the like. Here, a defocus amount is detected as the focusing state. It should be understood that a plurality of focus detection areas (focus detection positions) are individually set, corresponding to a plurality of positions within the image field of the photographic lens 8, although the details thereof will be described hereinafter. The focus detection calculation unit 19g detects a defocus amount for each of this plurality of focus detection areas, based upon the focus detection signal that is outputted from the range-finding element 10, corresponding to its pair of optical images.

It should be understood that, with the camera 1 according to this embodiment, by control of the body control device 19 according to actuation by the user, it is possible to set either of two focus adjustment modes whose control methods are different. One mode is a tracking priority mode in which focus adjustment is performed with emphasis being accorded to the result of image tracking. When this mode is set, focus adjustment of the photographic lens 8 is performed while employing, as a priority, the defocus amount that is detected in a focus detection area that corresponds to the position of the image that corresponds to the reference image recognized by the image tracking process. And another mode that can be set upon the camera 1 is a selected area priority mode in which focus adjustment is performed with emphasis being accorded to a focus detection area that has been selected in advance by the user. When this mode is set, focus adjustment is performed while employing, as a priority, the defocus amount for the focus detection area that has been selected by the user in advance.

The lens drive amount calculation unit 19h converts the defocus amount that is employed into a lens drive amount, that it outputs to the lens control device 22. Based upon this lens drive amount, the focusing lens 8b is driven by the lens control device 22, and thereby the focus adjustment of the photographic lens 8 is performed.

Figure 3:
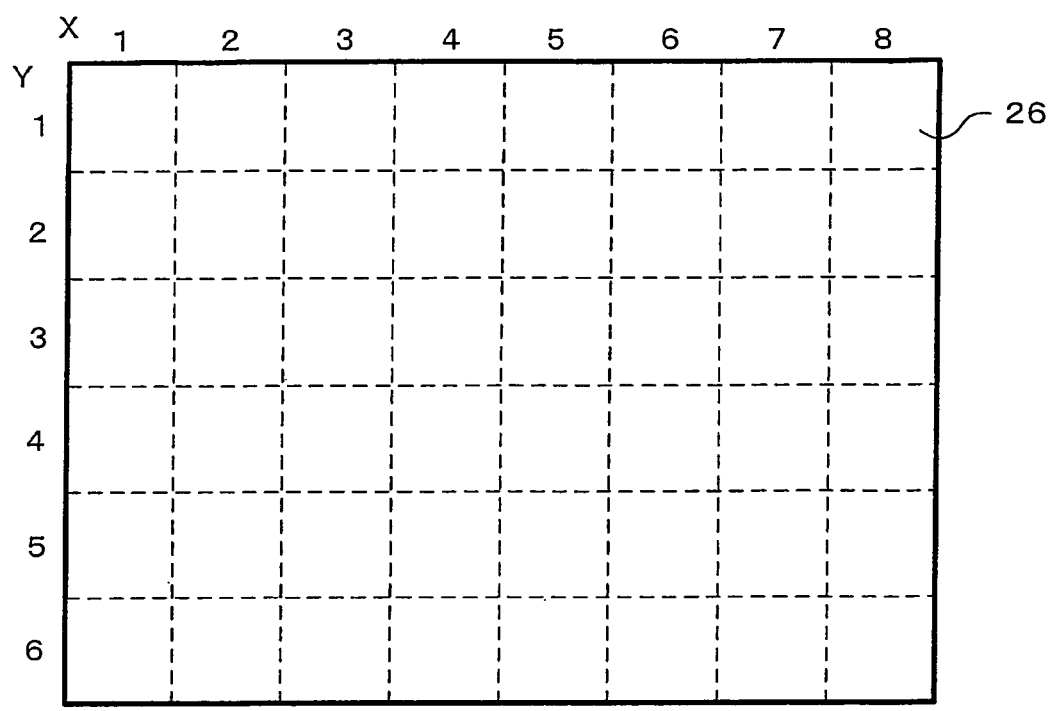
FIG. 3 is a figure showing the detailed structure of a second image sensor.
Figure 4:
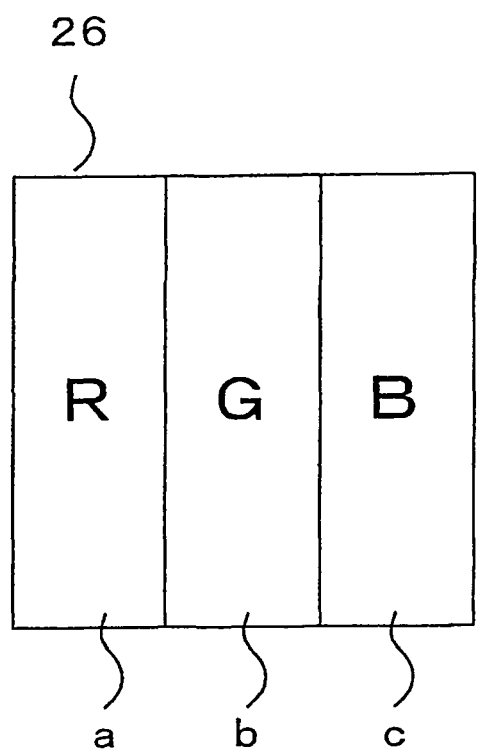
FIG. 4 is a figure showing the way in which a pixel of the second image sensor is subdivided.

FIG. 3 is a front view showing the schematic structure of the second image sensor 16. This second image sensor 16 includes a plurality of pixels 26 (photoelectric conversion elements) that are arrayed in the form of a matrix (here 8 horizontally by 6 vertically, =48 in total). As shown in FIG. 4, each of these pixels 26 is divided into three portions 26a, 26b, and 26c, and respective red R, green G, and blue B primary color filters are provided upon these portions 26a, 26b, and 26c. Due to this, it is possible to output an RGB signal of the image of the photographic subject for each of the pixels 26. It should be understood that the number of pixels in the second image sensor 16 is not to be considered as being limited to the number of pixels of this embodiment.

Figure 5:
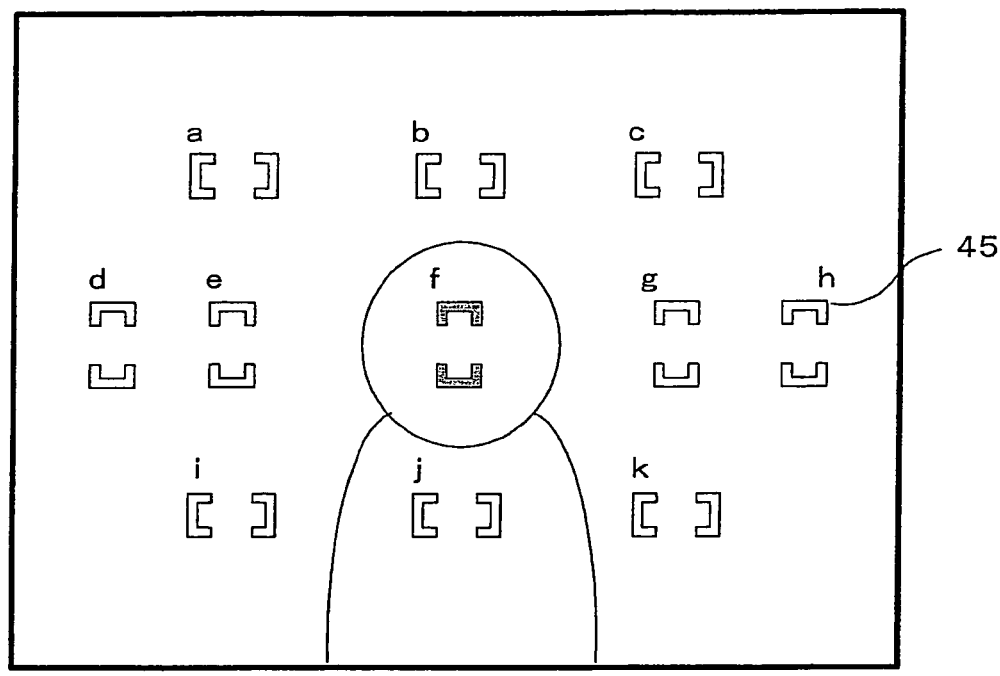
FIG. 5 is a figure showing an example of an image of a photographic subject.

Next, the photographic subject tracking operation according to one embodiment of the present invention will be explained. FIGS. 5 through 7 are figures for explanation of the photographic subject tracking method according to this embodiment, and FIGS. 8 through 13 are flow charts showing photographic subject tracking processing according to this embodiment. Except for when the camera 1 is performing photography due to the shutter release button being full pressed by the photographer, the quick return mirror 5 is set into the photographic optical path as shown by the broken line in FIG. 1, so that the light from the photographic subject that is incident from the photographic lens 8 is imaged upon the focus plate 11. And this image of the photographic subject upon the focus plate 11 is conducted to the second image sensor 16 via the roof pentaprism 13, the prism 17 and the imaging lens 18, so that image information for an image of the photographic subject is outputted from the second image sensor 16.

FIG. 5 is an example of an image of a photographic subject that the photographer may visually confirm through the eyepiece window 15 (i.e. a viewfinder image). Photographic information such as focus detection area marks and the like is displayed by the liquid crystal display element 12 as superimposed over this image of the photographic subject that has been imaged upon the focus plate 11 by the photographic lens 8. This image of the photographic subject upon which the photographic information is displayed as superimposed is conducted to the eyepiece window 15 via the roof pentaprism 13 and the eyepiece lens 14. Due to this, the photographer is able visually to check the image of the photographic subject and the photographic information. In this embodiment, eleven focus detection areas 45*a* through 45*k* are set within the photographic view of the photographic lens 8. The liquid crystal display element 12 displays the position of these focus detection areas 45*a* through 45*k* by superimposing area marks over the image of the photographic subject upon the focus plate 11. For example, when the photographer selects any desired one of these areas with a focus detection area selection switch included in the actuation members 20, then this area mark 45 is displayed as lighted up.

When the shutter release button of the actuation members 20 is half pressed by the photographer, the body control device 19 starts the photographic subject tracking processing whose flow chart is shown in FIG. 8. In a step S1, the body control device 19 acquires the image information that is outputted from the second image sensor 16. In this image information, the RGB value for each pixel is expressed by the following Equation (1). In Equation (1), x and y are the coordinate values for the pixels. With the second image sensor 16 shown by way of example in FIG. 3, x=1~8 and y=1~6.

$$R[x,y], G[x,y], B[x,y] \quad (1)$$

In a step S2, based upon the image information that was acquired in the step S1, the body control device 19 calculates color information (here, the color biases) RG and BG for each pixel. Moreover, it calculates luminance information L according to Equations (2) below, based upon the exposure time period T, the gain Gain, and color combination coefficients Kr, Kg, and Kb.

$$RG[x,y]=\text{Log}_2(R[x,y])-\text{Log}_2(G[x,y])$$

$$BG[x,y]=\text{Log}_2(B[x,y])-\text{Log}_2(G[x,y])$$

$$L[x,y]=\text{Log}_2(Kr\cdot R[x,y]+Kg\cdot G[x,y]+Kb\cdot B[x,y])-\text{Log}_2(T)-\text{Log}_2(\text{Gain}) \quad (2)$$

The body control device 19 stores this color information RG and BG and this luminance information L in the memory 19*d* for use as a template image.

In a step S3, the body control device 19 acquires a focus detection signal according to the pair of optical images for focus detection that have been detected by the range-finding element 10 for each of the focus detection areas 45*a* through 45*k*.

In a step S4, based upon the focus detection signal acquired in the step S3, the body control device 19 calculates defocus amounts D[N] (where N=a~k) that specify the focus adjustment state of the photographic lens 8 for each of the focus detection areas 45*a* through 45*k*. It should be understood that the character substituted for N denotes the corresponding focus detection area. In other words, for example, the defocus amount that is obtained for the focus detection area 45*a* is denoted by D[a]. By the body control device calculating the defocus amounts in this manner, the focusing state of the photographic lens 8 is detected.

In a step S5, the body control device 19 sets the tracking subject position that is to be taken as the subject upon which image tracking is to be performed. Here, for example, any one of the focus detection areas 45*a* through 45*k* may be selected by the user, and this focus detection area that has been selected is set as the tracking subject position. Or, it would also be acceptable to arrange for the tracking subject position to be set automatically by the camera 1. For example, that focus detection area that has the closest range defocus amount may be set automatically as the tracking subject position. It would also be acceptable to select any one of the focus detection areas by some other method, and to set it as the tracking subject position.

In a step S6, the body control device 19 acquires reference information, in other words information for a template image for image tracking, and stores it in the memory 19*d*. Here, among the color information and the luminance information that were calculated in the step S2, the color information and the luminance information of an image portion that corresponds to a predetermined range around the tracking subject position that was set in the step S5 is taken as being the reference information, and is stored in the memory 19*d*.

Figure 6A:
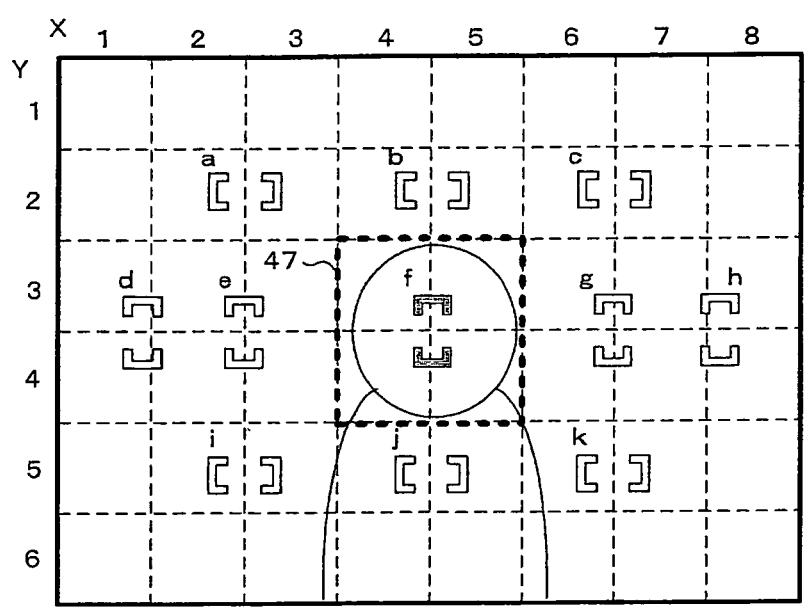
FIGS. 6A and 6B are figures showing the way in which a template image is acquired.
Figure 6B:
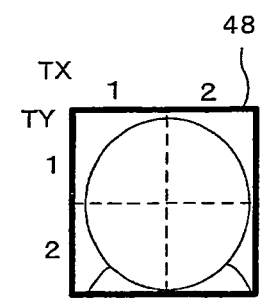

If, as shown for example in FIG. 6A, the focus detection area 45*f* that is positioned in the center of the screen is set as the tracking subject position, then the region around it surrounded by the dotted line portion denoted by the reference symbol 47 is taken as being the tracking photographic subject region, and the color information and the luminance information of the portion corresponding to this region are stored as the reference information. In other words, the RG[x,y], BG[x,y] and L[x,y] given by the previously described Equations (2) over the ranges x=4~5 and y=3~4 are stored in the memory 19*d* as the reference information. By doing this, the template image information 48 shown in FIG. 6B is stored as the reference information. If the color information for the template image 48 that is stored in this manner (here the color biases) is denoted by TRG and TBG, while the luminance information is denoted by TL, then these are given by the following Equations (3). It should be understood that while, here, it is arranged to store, as the reference information, template image information 48 that consists of two pixels vertically by two pixels horizontally, the size of the template image is not to be considered as being limited to this case.

$$TRG[TX,TY]=RG[x,y]$$

$$TBG[TX,TY]=BG[x,y]$$

$$TL[TX,TY]=L[x,y]$$

$$\text{(where } TX,TY=1\text{~}2, x=4\text{~}5, \text{ and } y=3\text{~}4) \quad (3)$$

In a step S7, in a similar manner to the step S1, the body control device 19 acquires the image information that is outputted from the second image sensor 16. And in the next step S8, in a similar manner to the step S2, based upon the image information that was acquired in the step S7, the body control device 19 calculates the color information RG and BG and the luminance information L for each pixel.

And, in a step S9, based upon the color information and the luminance information that have been calculated in the step S8, the body control device 19 performs image tracking calculation for recognizing the position of the tracking subject image within the photographic scene. Here, by comparing together the color information and the luminance information that were calculated in the step S8, and the reference information that was stored in the step S6, an image that corresponds to the reference information is detected and its position is specified. The method by which this is done is explained below.

When performing the image tracking calculation, first, the body control device 19 sequentially cuts out regions of the same size as the template image 48 from within the image that is specified by the color information and the luminance information that were acquired in the step S8 (i.e. the image to be tracked), and calculates the difference Diff between the color information for the corresponding pixels of the image that has been cut out and the template image 48. For example, if it is supposed that an image to be tracked like the one shown in FIG. 7A has been acquired, then, as shown by the thick broken line in the figure, the difference Diff with respect to the color information of the template image 48 is calculated repeatedly while shifting one pixel at a time within the image to be tracked.

Figure 7A:
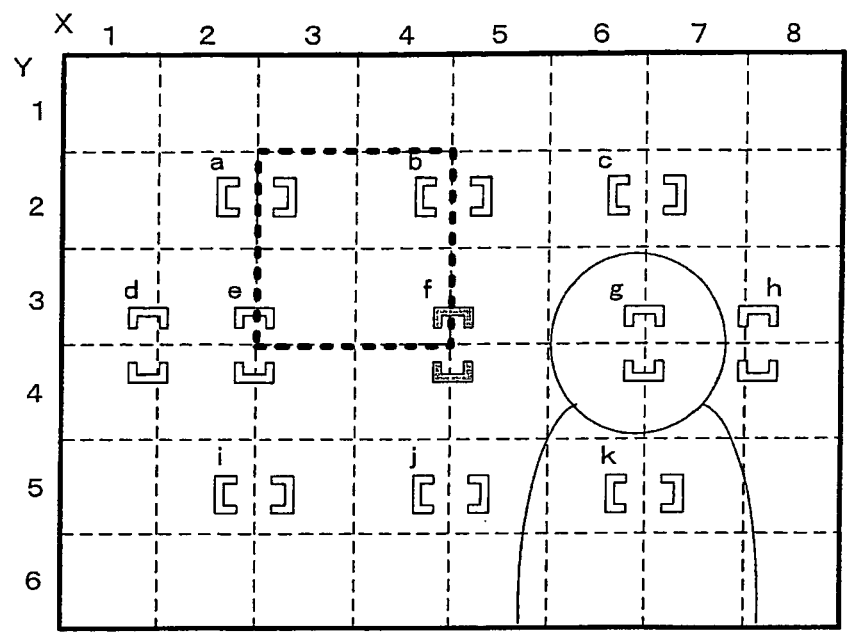
FIGS. 7A and 7B are figures showing the way in which a tracking region within an image to be tracked is specified.

Now, if as shown in FIG. 7A the start point position of the image that has been cut out is taken as being (HX,HY)=(3,2), then the calculation of the difference Diff is performed according to the following Equation (4):

$$\text{Diff}[HX,HY]=\Sigma\Sigma\{Krg\cdot ABS(RG[HX-1+TX,HY-1+TY]-TRG[TX,TY])+Kbg\cdot ABS(BG[HX-1+TX,HY-1+TY]-TBG[TX,TY])+Kl\cdot ABS(L[HX-1+TX,HY-1+TY]-TL[TX,TY])\} \quad (4)$$

In the above Equation (4), Krg, Kbg, and Kl are weighting coefficients that are set in advance in consideration of the difference in degree of influence of the items of color information and the luminance information. Moreover, TX,TY=1~2, HX=3, and HY=2, and the sum is calculated over TX=1~2 and TY=1~2.

Next, the body control device 19 searches for the minimum difference among the differences Diff[HX,HY], and specifies the cut out region described above within the image to be tracked when this minimum difference was calculated as being the tracking region. As shown for example in FIG. 7B here, the cut out region denoted by the reference symbol 49, whose start point position is (x,y)=(6,3), is taken as being the tracking region. By specifying the tracking region 49 within the image to be tracked in this manner, the position of the image within the image to be tracked that corresponds to the template image 48 is recognized.

Here, it would also be acceptable to perform additional processing for updating the image information of the template image 48, using the image information of the tracking region 49 that has been specified. In this case, by for example adding 20% of the image information of the tracking region 49 to 80% of the image information of the original template image 48, the newest image information may be updated a little at a time into the information of the template image, so that it becomes easier to perform tracking of change in the tracked photographic subject. In this case, it would also be acceptable to arrange, not to perform this updating every time the tracking calculation is performed, but rather to perform this updating based upon the magnitude of the difference Diff at the position that is determined as being the tracking region 49, i.e. only when this difference is smaller than some threshold value. Moreover, it would also be acceptable to obtain a characteristic amount for the image, that specifies the difference between it and the template image, by some method other than Equation (4).

In a step S10, the body control device 19 acquires a focus detection signal according to the pair of optical images for focus detection that have been detected by the range-finding element 10 for each of the focus detection areas 45a through 45k. And in the step S11, based upon this focus detection signal that has been acquired in the step S10, the body control device 19 calculates defocus amounts D[N] (where N=a~k), that specify the focus adjustment states of the photographic lens 8 for each of the focus detection areas 45a through 45k.

In a step S12, the body control device 19 executes employed defocus amount determination processing in order to determine which defocus amount, among the defocus amounts that have been calculated in the step S11, is to be employed for focus adjustment. The details of this employed defocus amount determination processing will be explained hereinafter with reference to the flow charts of FIGS. 9 and 10. By executing the employed defocus amount determination processing in this step S12, the body control device 19 determines which one of the defocus amounts that have been calculated in the step S11 is to be taken as the employed defocus amount that is used for focus adjustment this time.

In a step S13, the body control device 19 converts the employed defocus amount that has been determined in the step S12 into a lens drive amount, and then performs focus adjustment of the photographic lens 8 by driving the focusing lens 8b with the lens control device 22.

In a step S14, the body control device 19 checks whether or not full press actuation of the shutter release button of the actuation members 20 has been performed by the user. If the shutter release button has been full pressed, then the flow of control proceeds to a step S15, and in this step S15 photographic processing is executed. The details of this photographic processing will be explained hereinafter with reference to the flow charts of FIGS. 11, 12, and 13. When the step S15 has been executed, the body control device 19 terminates the flow chart of FIG. 8 and the photographic subject tracking processing is completed.

If, on the other hand, in the step S14 full press actuation of the shutter release button is not being performed, then the body control device 19 proceeds to a step S16, in which it is checked whether or not half press actuation of the shutter release button is being performed. If the half press actuation of the shutter release button is being continued, then the flow of control returns to the step S7 and the processing described above is repeated. On the other hand, if half press actuation of the shutter release button is not being performed, then the flow chart of FIG. 8 terminates and the photographic subject tracking processing stops.

Next, the employed defocus amount determination processing that is executed in the step S12 will be explained. FIGS. 9 and 10 are flow charts for this employed defocus amount determination processing. In a step S21, the body control device 19 decides whether the mode that is currently set is the previously described selected area priority mode or the tracking priority mode. If the selected area priority mode is set then the flow of control is transferred to a step S22, whereas if the tracking priority mode is set then the flow of control is transferred to a step S31 of FIG. 10.

In the step S22, the body control device 19 acquires, from among the defocus amounts for the focus detection areas 45a through 45k that were calculated in the step S11 of FIG. 8, the defocus amount for the focus detection area that has been selected by the user in advance (i.e. for the user selected area). For example, in the case of FIG. 7B, if the focus detection area 45f is set as the user selected area, then the defocus amount D[f] for this focus detection area 45f is acquired.

In a step S23, the body control device 19 compares together this defocus amount for the user selected area that has been acquired in the step S22, and the employed defocus amount that was determined in the step S12 when it was performed the previous time. In other words, in the example described above, it compares the defocus amount D[f] that was acquired as being the defocus amount for the user selected area with the employed defocus amount the previous time. It should be understood that, when executing this employed defocus amount determination processing of the step S12 initially after the shutter release button has been half press actuated, the defocus amount for the focus detection area that was set as the tracking subject position in the step S5 may be taken as the employed defocus amount the previous time.

In a step S24, the body control device 19 makes a decision as to whether or not the difference between the defocus amount for the user selected area compared in the step S23 and the employed defocus amount the previous time is within a predetermined value. If the difference between these defocus amounts is within the predetermined value, then the flow of control proceeds to a step S25, in which the defocus amount for the user selected area that was acquired in the step S22 is confirmed as being the employed defocus amount this time. In other words, in the example described above, the defocus amount D[f] is taken as being the employed defocus amount this time. When the step S25 has been executed, the body control device 19 terminates this employed defocus amount determination processing and the flow of control is transferred to the step S13 of the FIG. 8 flow chart. On the other hand, if the difference between the defocus amount for the user selected area that was compared in the step S23 and the employed defocus amount the previous time is greater than or equal to the predetermined value, then the flow of control proceeds to a step S26.

Figure 7B:
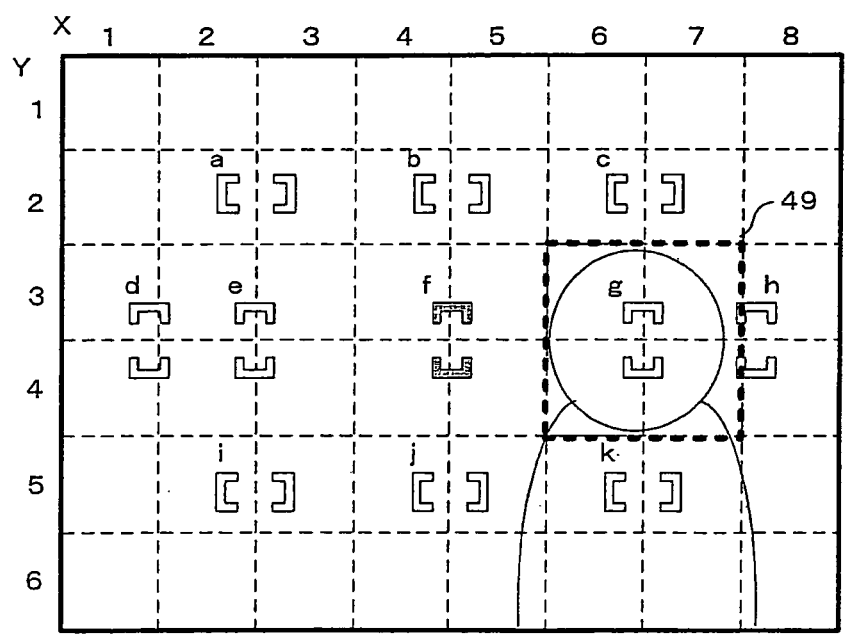

In this step S26, the body control device 19 acquires, from among the defocus amounts for the various focus detection areas 45a through 45k that were calculated in the step S11, the defocus amounts for the peripheral areas to the user selected area, in other words the defocus amounts for the focus detection areas that are peripheral to the user selected area. For example if, as previously described, the focus detection area 45f in FIG. 7B is set as the user selected area, then the defocus amounts D[b], D[e], D[g], and D[j] for the focus detection areas 45b, 45e, 45g, and 45j that are adjacent thereto above, below, on its left, and on its right are acquired.

In a step S27, the body control device 19 selects, among the defocus amounts for the peripheral areas to the user selected area that were acquired in the step S26, that defocus amount for which the difference between it and the employed defocus amount the previous time is the smallest. For example, in the example described above, among the defocus amounts D[b], D[e], D[g], and D[j] that have been acquired, if the defocus amount D[g] is the one whose difference with the employed defocus amount the previous time is the smallest, then this defocus amount D[g] is selected.

In a step S28, the body control device 19 makes a decision as to whether or not the difference between the defocus amount that has been selected in the step S27 and the employed defocus amount the previous time is within a predetermined value. If the difference between these defocus amounts is within the predetermined value then the flow of control proceeds to a step S29, and, in this step S29, it is confirmed that the defocus amount that was selected in the step S27 is to be used as the employed defocus amount this time. In other words, in the example described above, the defocus amount D[g] is taken as being the employed defocus amount this time. When the step S29 has been executed, the body control device 19 terminates this employed defocus amount determination processing and the flow of control is transferred to the step S13 of the FIG. 8 flow chart.

If, on the other hand, the difference between the defocus amount that was selected in the step S27 and the employed defocus amount the previous time is greater than or equal to the predetermined value, then the body control device 19 transfers the flow of control to a step S30. In this step S30, the body control device 19 considers that no defocus amount that will be effective this time has been detected, and does not confirm any one of the defocus amounts that were calculated in the step S11 as being the employed defocus amount, and does not use any one of them. When the step S30 has been executed, the body control device 19 terminates this employed defocus amount determination processing and the flow of control is transferred to the step S13 of the FIG. 8 flow chart. In this case, drive control of the focusing lens 8b by the focus adjustment control of the step S13 is not performed, and accordingly the focus adjustment state of the photographic lens 8 is not changed.

If in the step S21 it is decided that the tracking priority mode is set, then the flow of control is transferred to a step S31 of FIG. 10, and, in this step S31, the body control device 19 acquires, from among the defocus amounts for the focus detection areas 45a through 45k that were calculated in the step S11, the defocus amount for the center area within the tracking region that was specified by the image tracking calculation of the step S9. Here, the focus detection area that is closest to the center of the tracking region is taken as being this center area, and its defocus amount is acquired. In other words, in the example of FIG. 7B, the defocus amount D[g] for the focus detection area 45g that is closest to the center of the tracking region 49 is acquired.

In a step S32, the body control device 19 compares together this defocus amount for the center area within the tracking region that has been acquired in the step S31, and the employed defocus amount that was determined in the step S12 when it was performed the previous time. In other words, in the example described above, it compares the defocus amount D[g] with the employed defocus amount the previous time.

In a step S33, the body control device 19 makes a decision as to whether or not the difference between the defocus amount for the center area within the tracking region compared in the step S32 and the employed defocus amount the previous time is within a predetermined value. If the difference between these defocus amounts is within the predetermined value, then the flow of control proceeds to a step S34, in which the defocus amount for the center area within the tracking region that was acquired in the step S31 is confirmed as being the employed defocus amount this time. In other words, in the example described above, the defocus amount D[g] is taken as being the employed defocus amount this time. When the step S34 has been executed, the body control device 19 terminates this employed defocus amount determination processing and the flow of control is transferred to the step S13 of the FIG. 8 flow chart. On the other hand, if the difference between the defocus amount for the center area within the tracking region that was compared in the step S32 and the employed defocus amount the previous time is greater than or equal to the predetermined value, then the flow of control proceeds to a step S35.

In this step S35, the body control device 19 acquires, from among the defocus amounts for the various focus detection areas 45a through 45k that were calculated in the step S11, the defocus amounts for the focus detection areas that are positioned within the tracking region specified by the image tracking calculation of the step S9, and that are positioned peripheral thereto. For example, for the tracking region 49 of FIG. 7B, the defocus amounts D[c], D[h], and D[k] for the adjacent focus detection areas 45c, 45h, and 45k are acquired. It should be understood that, at this time, the defocus amount for the center area within the tracking region that was acquired in the step S31, in other words the defocus amount D[g] for the focus detection area 45g, is excluded from the subjects for acquisition.

In a step S36, the body control device 19 selects, among the defocus amounts that were acquired in the step S35, that defocus amount for which the difference between it and the employed defocus amount the previous time is the smallest. For example, in the example described above, among the defocus amounts D[c], D[h], and D[k] that have been acquired, if the defocus amount D[k] is the one whose difference with the employed defocus amount the previous time is the smallest, then this defocus amount D[k] is selected.

In a step S37, the body control device 19 makes a decision as to whether or not the difference between the defocus amount that has been selected in the step S36 and the employed defocus amount the previous time is within a predetermined value. If the difference between these defocus amounts is within the predetermined value then the flow of control proceeds to a step S38, and, in this step S38, it is confirmed that the defocus amount that was selected in the step S36 is to be used as the employed defocus amount this time. In other words, in the example described above, the defocus amount D[k] is taken as being the employed defocus amount this time. When the step S38 has been executed, the body control device 19 terminates this employed defocus amount determination processing and the flow of control is transferred to the step S13 of the FIG. 8 flow chart. If, on the other hand, the difference between the defocus amount that was selected in the step S36 and the employed defocus amount the previous time is greater than or equal to the predetermined value, then the body control device 19 transfers the flow of control to a step S39.

In this step S39, the body control device 19 acquires, from among the defocus amounts for the various focus detection areas 45a through 45k that were calculated in the step S11, the defocus amount that has been detected this time for the focus detection area that was employed last time, in other words the defocus amount for that focus detection area for which the employed defocus amount was detected the previous time, and the defocus amounts for the focus detection areas that are positioned peripheral thereto. For example, if the focus detection area that was employed the previous time was the focus detection area 45a in FIG. 7B, then its defocus amount D[a], and the defocus amounts D[b], D[d], D[e], and D[f] for the focus detection areas 45b, 45d, 45e, and 45f that are adjacent to this focus detection area 45a are acquired.

In a step S40, the body control device 19 selects, among the defocus amounts that were acquired in the step S39, that defocus amount for which the difference between it and the employed defocus amount the previous time is the smallest. For example, in the example described above, among the defocus amounts D[b], D[d], D[e], and D[f] that have been acquired, if the defocus amount D[f] is the one whose difference with the employed defocus amount the previous time is the smallest, then this defocus amount D[f] is selected.

In a step S41, the body control device 19 makes a decision as to whether or not the difference between the defocus amount that has been selected in the step S40 and the employed defocus amount the previous time is within a predetermined value. If the difference between these defocus amounts is within the predetermined value then the flow of control proceeds to a step S42, and, in this step S42, it is confirmed that the defocus amount that was selected in the step S40 is to be used as the employed defocus amount this time. In other words, in the example described above, the defocus amount D[f] is taken as being the employed defocus amount this time. When the step S42 has been executed, the body control device 19 terminates this employed defocus amount determination processing and the flow of control is transferred to the step S13 of the FIG. 8 flow chart.

If, on the other hand, the difference between the defocus amount that was selected in the step S40 and the employed defocus amount the previous time is greater than or equal to the predetermined value, then the body control device 19 proceeds to a step S43. In this step S43, the body control device 19 considers that no defocus amount that will be effective this time has been detected, and does not confirm any one of the defocus amounts that were calculated in the step S11 as being the employed defocus amount, and does not use any one of them as the defocus amount. When the step S43 has been executed, the body control device 19 terminates this employed defocus amount determination processing and the flow of control is transferred to the step S13 of the FIG. 8 flow chart. In this case, drive control of the focusing lens 8b by the focus adjustment control of the step S13 is not performed, and accordingly the focus adjustment state of the photographic lens 8 is not changed.

By the employed defocus amount determination processing as explained above being executed in the step S12 of the FIG. 8 flow chart, one of the defocus amounts that have been calculated in the step S11 is determined as being the employed defocus amount to be used for focus adjustment this time. By the focus adjustment control of the step S13 being performed based upon this employed defocus amount, the focus adjustment state of the photographic lens 8 is changed as is appropriate according to the movement of the photographic subject.

Figure 11:
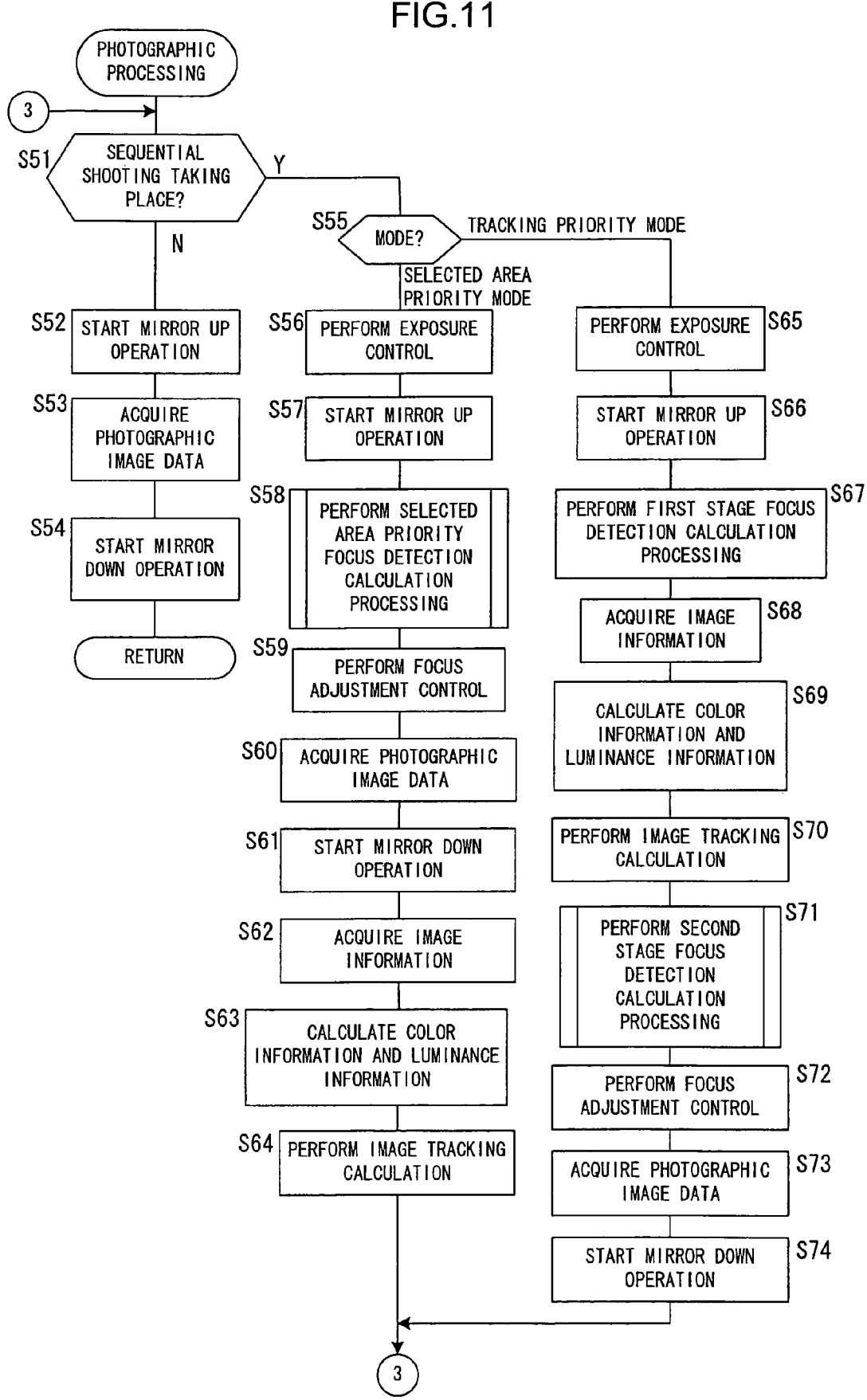
FIG. 11 is a flow chart showing the flow of photographic processing that is executed by the photographic subject tracking processing.

Next, the photographic processing that is executed in the step S15 will be explained. FIG. 11 is a flow chart for this photographic processing. In a step S51, the body control device 19 decides whether or not sequential shooting is taking place. When a predetermined type of sequential shooting actuation is performed, for example when the camera 1 is set to a sequential shooting mode, and full press operation of the shutter release button is continuously performed, then it is decided that sequential shooting is taking place, and the flow of control proceeds to a step S55. On the other hand, if this type of sequential shooting actuation is not being performed, then it is decided that sequential shooting is not taking place, and the flow of control proceeds to a step S52.

In this step S52, the body control device 19 starts the mirror up operation in order to retract the quick return mirror 5 and the sub-mirror 6 from the photographic optical path. When the mirror up operation has terminated, the next step S53 is executed. In this step S53, the body control device 19 acquires photographic image data by opening the shutter 7 and capturing an image of the photographic subject, imaged by the photographic lens 8, upon the first image sensor 4. This captured image data, after having been subjected to required image processing, is recorded upon an image recording medium (not shown in the figures) such as a memory card or the like. And in a step S54 the mirror down operation is started in order to return the quick return mirror 5 and the sub-mirror 6, that were retracted from the photographic optical path, back into that path. When the step S54 has been executed, the body control device 19 terminates this photographic processing.

On the other hand, if in the step S51 it is decided that sequential shooting is taking place and the flow of control has been transferred to the step S55, then in this step S55 the body control device 19 decides which mode is set, i.e. which of the previously described selected area priority mode and tracking priority mode is set. If the selected area priority mode is set then the flow of control proceeds to a step S56, whereas if the tracking priority mode is set then the flow of control is transferred to a step S65.

In the step S56, the body control device 19 performs exposure control for the range-finding element 10 and the second image sensor 16. In this exposure control, an appropriate exposure time period is set for both the range-finding element 10 and the second image sensor 16. When the set exposure time period elapses, a focus detection signal is outputted from the range-finding element 10 and image information is outputted from the second image sensor 16. After the exposure time period that is set in the exposure control of the step S56 has elapsed, in a step S57 the body control device 19 starts the mirror up operation in order to retract the quick return mirror 5 and the sub-mirror 6 from the photographic optical path.

After starting the mirror up operation, in a step S58, the body control device 19 detects the defocus amount in the user selected area as a priority, and performs selected area priority focus detection calculation processing in order to perform focus adjustment of the photographic lens 8. The details of this selected area priority focus detection calculation processing will be explained hereinafter with reference to the flow chart of FIG. 12. By executing the selected area priority focus detection calculation processing in this step S58, the body control device 19 obtains a defocus amount for any one of the focus detection areas, and determines an employed defocus amount to be used for focus adjustment this time.

In a step S59, the body control device 19 converts the employed defocus amount that has been determined in the step S58 into a lens drive amount, and then performs focus adjustment of the photographic lens 8 by driving the focusing lens 8b with the lens control device 22. It should be understood that the selected area priority focus detection calculation processing of the step S58 and the focus adjustment control of the step S59 may be performed during the mirror up operation.

When the mirror up operation has ended, the body control device performs a step S60. In this step S60, the body control device 19 opens the shutter 7 and captures an image of the photographic subject that has been imaged by the photographic lens 8 upon the first image sensor 4, thus acquiring photographic image data. Thereafter, the photographic image data that has been acquired is recorded upon the image recording medium, as previously described. And in a step S61 the mirror down operation is started, in order to return the quick return mirror 5 and the sub-mirror 6, that were retracted from the photographic optical path, back into that path.

In the steps S62 through S64, the body control device 19 performs similar processing to that of the steps S7 through S9 of the FIG. 8 flow chart, respectively. In other words, in the step S62 image information that is outputted from the second image sensor 16 is acquired, in the next step S63 color information RG and BG and luminance information L for each pixel are calculated based upon the image information that was acquired in the step S62, and in the next step S64 image tracking calculation is performed based upon the color information and the luminance information that were calculated in the step S63. By doing this, in the image to be tracked that corresponds to the image information that has been acquired, the position of an image that corresponds to the reference information is recognized; in other words the position of an image that is equivalent to the template image 48 is recognized.

When the step S64 has been executed, the body control device 19 returns the flow of control to the step S51 and repeats the processing previously described. By doing this, if the selected area priority mode is set, during sequential shooting, the processing of the steps S56 through S64 is repeatedly executed. As a result, the step S60 is repeatedly executed, and image capture by the first image sensor 4 is repeated a plurality of times.

If in the step S55 it was decided that the tracking priority mode is set and the flow of control has been transferred to the step S65, then in this step S65 the body control device 19 performs exposure control with the range-finding element 10 and the second image sensor 16, as was done in the step S56. After the exposure time period that has been set has elapsed, in a step S66, the body control device 19 starts the mirror up operation, in order to retract the quick return mirror 5 and the sub-mirror 6 from the photographic optical path.

After the mirror up process has started, in a step S67, the body control device 19 performs first stage focus detection calculation processing. In this first stage focus detection calculation, based upon the focus detection signal from the range-finding element 10, defocus amounts are calculated for the employed focus detection area the previous time, in other words for the focus detection area for which the employed defocus amount that was determined by the second stage focus detection calculation processing of the step S71 executed the previous time was detected, and for focus-detection areas that are positioned adjacent thereto. For example, if it is supposed that the area that was employed the previous time was the focus detection area 45a of FIG. 7B, then the defocus amount D[a] this time for this focus detection area 45a, and the defocus amounts D[b], D[d], D[e], and D[f] this time for the focus detection areas 45b, 45d, 45e, and 45f that are adjacent to the focus detection area 45a are obtained. By doing this, before performing the image tracking calculation of the step S70, the focusing state of the photographic lens 8 is obtained for which focus detection area, among the plurality of focus detection areas 45a through 45k, that was employed the previous time, and for the focus detection areas that have been selected in advance as being adjacent thereto. It should be understood that it would also be acceptable to arrange to execute the step S67 before the mirror up operation of the step S66 starts, if the exposure time period of the range-finding element 10 has elapsed before that of the second image sensor 16.

In the steps S68 through S70, just as in the steps S62 through S64, the body control device 19 performs similar processing to that of the steps S7 through S9 of the FIG. 8 flow chart, respectively. In other words, in the step S68 image information that is outputted from the second image sensor 16 is acquired, in the next step S69 color information RG and BG and luminance information L for each pixel are calculated based upon the image information that was acquired in the step S68, and in the next step S70 image tracking calculation is performed based upon the color information and the luminance information that were calculated in the step S69. By doing this, in the image to be tracked that corresponds to the image information that has been acquired, the position of an image that corresponds to the reference information is recognized; in other words the position of an image that is equivalent to the template image 48 is recognized.

In a step S71, the body control device 19 detects the defocus amount for the position that corresponds to the reference information recognized by the image tracking calculation of the step S70, and executes second stage focus detection calculation processing for performing focus adjustment of the photographic lens 8. The details of this second stage focus detection calculation processing will be explained hereinafter with reference to the flow chart of FIG. 13. By executing this second stage focus detection calculation processing in the step S71, the body control device 19 obtains a defocus amount for any one of the focus detection areas, and determines the employed defocus amount to be used for focus adjustment this time.

In a step S72, the body control device 19 converts the employed defocus amount that has been determined in the step S71 into a lens drive amount, and performs focus adjustment of the photographic lens 8 by driving the focusing lens 8b by the lens control device 22. It should be understood that the processing of the steps S67 through S72 may all be performed during the mirror up operation.

When the mirror up operation has ended, the body control device 19 executes a step S73. In this step S73, the body control device 19 opens the shutter 7 and takes an image of the photographic subject that has been imaged by the photographic lens 8 upon the first image sensor 4, thus acquiring photographic image data. Thereafter, this photographic image data that has been acquired is recorded upon the image recording medium, as previously described. And in a step S74 the mirror down operation is started, in order to return to the photographic optical path the quick return mirror 5 and the sub-mirror 6, that had been retracted from the photographic optical path.

When the step S74 has been executed, the body control device 19 returns the flow of control to the step S51 and repeats the processing described previously. By doing this, if the tracking priority mode is set, during sequential shooting, the processing of the steps S65 through S74 is repeatedly executed. As a result, the step S73 is repeatedly executed, and the image taking by the first image sensor 4 is repeated a plurality of times. And the first stage focus detection calculation processing of the step S67 and the second stage focus detection calculation processing of the step S71 are performed repeatedly at the interval between the time periods at which the image taking is repeated.

It should be understood that it would also be acceptable to arrange for the steps S65 through S74 described above to be performed if the time period for photography by the first image sensor 4 or the second image sensor 16 is longer than a predetermined time period. In other words, if the exposure time period becomes longer than some predetermined timing due to some cause such as the luminance of the photographic subject becoming low or the like, or if the accumulation time period of the first image sensor 4 or the second image sensor 16 becomes longer than a predetermined accumulation time period, then first stage focus detection calculation processing such as that shown in the step S67, before the image tracking calculation such as that shown in the step S70, and second stage focus detection calculation processing after the image tracking calculation, such as that shown in the step S71, are performed. On the other hand, if the exposure time period is longer than the predetermined timing and the accumulation time period is shorter than the predetermined accumulation time period, then it will be acceptable to perform the focus detection calculation processing after performing the image tracking calculation.

Due to this, it is possible to perform the focus detection calculation processing efficiently, even in a case such as one in which a certain time period is required until an image for tracking is obtained.

Now, the selected area priority focus detection calculation processing that is executed in the step S58 will be explained. FIG. 12 is a flow chart for this selected area priority focus detection calculation processing. In a step S81, the body control device 19 acquires from the range-finding element 10 a focus detection signal for the user selected area, that is a focus detection area among the focus detection areas 45a through 45k that the user has selected in advance, and calculates its defocus amount. For example, in FIG. 7B, if as previously described the focus detection area 45f is set as the user detected area, then a focus detection signal is acquired for this focus detection area 45f, and its defocus amount D[f] is calculated.

In a step S82, the body control device 19 compares the defocus amount of the user selected area that was calculated in the step S81 with the employed defocus amount that was determined by the selected area priority focus detection calculation processing that was executed the previous time. In other words, in the example described above, it compares the defocus amount D[f] that was calculated as the defocus amount for the user selected area with the employed defocus amount the previous time. It should be understood that, when executing the selected area priority focus detection calculation processing for the first time, the employed defocus amount that is finally determined by the step S12 of FIG. 8 may be taken as being the employed defocus amount the previous time.

In a step S83, the body control device 19 decides whether or not the difference between the defocus amount for the user selected area that was compared in the step S82 and the employed defocus amount the previous time is within a predetermined value. If the difference between these defocus amounts is within the predetermined value, then the flow of control proceeds to a step S84, and in this step S84 the defocus amount for the user selected area that was calculated in the step S81 is confirmed as being the defocus amount that is to be employed at this time. In other words, in the example described above, the defocus amount D[f] is taken as the employed defocus amount this time. When the step S84 has been executed, the body control device 19 terminates this selected area priority focus detection calculation processing and the flow of control is transferred to the step S59 of the FIG. 11 flow chart. On the other hand, if the difference between the defocus amount for the user selected area that was compared in the step S82 and the employed defocus amount the previous time is greater than or equal to the predetermined value, then the flow of control is transferred to a step S85.

In this step S85, the body control device 19 acquires from the range-finding element 10 the focus detection signals for those focus detection areas, among the focus detection areas 45a through 45k, that are peripheral areas to the user selected area, in other words that are adjacent to the user selected area, and calculates their defocus amounts. For example if, as previously described in FIG. 7B, the focus detection area 45f is set as the user selected area, then the focus detection signals for the focus detection areas 45b, 45e, 45g, and 45j that are above, below, to the left, and to the right thereof are acquired, and their defocus amounts D[b], D[e], D[g], and D[j] are calculated.

In a step S86, the body control device 19 selects that defocus amount, among the defocus amounts for the areas adjacent to the user selected area that have been calculated in the step S85, for which the difference with the employed defocus amount the previous time is the smallest. For example, in the example described above, among the defocus amounts D[b], D[e], D[g], and D[j] that have been calculated, if the defocus amount D[g] is the one whose difference from the employed defocus amount the previous time is the smallest, then that defocus amount D[g] is selected.

In a step S87, the body control device 19 makes a decision as to whether or not the difference between the defocus amount that was selected in the step S86 and the employed defocus amount the previous time is within a predetermined value. If the difference between these defocus amounts is within the predetermined value, then the flow of control proceeds to a step S88, and in this step S88 the defocus amount that was selected in the step S86 is confirmed as being the employed defocus amount to be used this time. In other words, in the example described above, the defocus amount D[g] is taken as being the defocus amount to be employed this time. When the step S88 has been executed, the body control device 19 terminates this selected area priority focus detection calculation processing and the flow of control is transferred to the step S59 of the FIG. 11 flow chart. On the other hand, if the difference between the defocus amount for the user selected area that was compared in the step S86 and the employed defocus amount the previous time is greater than or equal to the predetermined value, then the flow of control is transferred to a step S89.

In this step S89, the body control device 19 acquires from the range-finding element 10 the focus detection signals for those focus detection areas, among the focus detection areas 45a through 45k, that are within the tracking region that has been specified by the image tracking calculation of the step S64 the previous time and for those areas that are positioned adjacent thereto, and calculates their defocus amounts. For example, for the tracking region 49 of FIG. 7B, the defocus amounts D[c], D[h], and D[k] for the adjacent focus detection areas 45c, 45h, and 45k are calculated. It should be understood that, since the defocus amount D[g] for the focus detection area 45g has already been calculated in the step S85, here it is excluded from the subjects for calculation.

In a step S90, the body control device 19 selects, among the defocus amounts that have been calculated in the step S89, that one whose difference from the defocus amount that was employed the previous time is the smallest. For example, in the example above, among the defocus amounts D[c], D[h], and D[k] that have been calculated, if the defocus amount D[k] is the one whose difference from the defocus amount employed the previous time is the smaller, then that defocus amount D[k] is selected.

In a step S91, the body control device 19 makes a decision as to whether or not the difference between the defocus amount that was selected in the step S90 and the employed defocus amount the previous time is within a predetermined value. If the difference between these defocus amounts is within the predetermined value, then the flow of control proceeds to a step S92, and in this step S92 the defocus amount that was selected in the step S90 is confirmed as being the employed defocus amount to be used this time. In other words, in the example described above, the defocus amount D[k] is taken as being the defocus amount to be employed this time. When the step S92 has been executed, the body control device 19 terminates this selected area priority focus detection calculation processing and the flow of control is transferred to the step S59 of the FIG. 11 flow chart.

On the other hand, if the difference between the defocus amount that was selected in the step S90 and the employed defocus amount the previous time is greater than or equal to the predetermined value, then the flow of control is transferred to a step S93. In this step S93 the body control device 19 considers that, this time, it has not been possible to detect any effective defocus amount, and accordingly it does not confirm any of the defocus amounts that have been calculated as being the defocus amount to be employed, and does not employ any defocus amount. When the step S93 has been executed, the body control device 19 terminates this selected area priority focus detection calculation processing and the flow of control is transferred to the step S59 of the FIG. 11 flow chart. In this case, drive control of the focusing lens 8b is not performed by the focus adjustment control of the step S59, and accordingly the focus adjustment state of the photographic lens 8 is not changed.

By the selected area priority focus detection calculation processing such as explained above being executed in the step S58 of the FIG. 11 flow chart, the defocus amount for the user selected area is detected as a priority, and thereby the employed defocus amount that is to be used for focus adjustment this time is determined. By performing the focus adjustment control of the step S59 based upon this defocus amount to be employed, during sequential shooting, the focus adjustment state of the photographic lens 8 is changed in an appropriate manner according to the movement of the photographic subject.

Next, the second stage focus detection calculation processing that is executed in the step S71 of FIG. 11 will be explained. FIG. 13 is a flow chart for this second stage focus detection calculation processing. In a step S101, the body control device 19 makes a decision as to whether or not, in the image tracking calculation that has been performed in the directly preceding step S70, it has been possible to specify a tracking region. If it has been possible to specify a tracking region, in other words if it has been possible for the position of reference information that specifies the template image 48 in the image to be tracked to be recognized, then the flow of control proceeds to a step S102. On the other hand, if it has not been possible to specify the tracking region, in other words if it has not been possible for the position of reference information that specifies the template image 48 in the image to be tracked to be recognized, then the body control device 19 terminates this second stage focus detection calculation processing and the flow of control is transferred to the step S72 of the FIG. 11 flow chart. Due to this, if it has not been possible to specify the tracking region, then the body control device 19 prohibits the execution of this second stage focus detection processing and the detection of the focusing state of the photographic lens 8.

In a step S102, the body control device 19 acquires from the range-finding element 10 a focus detection signal for the center area within the tracking region that was specified, among the focus detection areas 45a through 45k, by the image tracking calculation of the step S70, in other words a focus detection signal the focus detection area that is closest to the center of the tracking region, and calculates its defocus amount. In other words, in the example of FIG. 7B, a focus detection signal is acquired for the focus detection area 45g that is positioned most close to the center of the tracking region 45g, and its defocus amount D[g] is calculated.

In a step S103, the body control device 19 compares the defocus amount of the center area within the tracking region that was calculated in the step S102 with the employed defocus amount that was determined by the second stage focus detection calculation processing that was executed the previous time. In other words, in the example described above, it compares the defocus amount D[g] that has been calculated with the employed defocus amount the previous time. It should be understood that, when executing the second stage focus detection calculation processing for the first time, the employed defocus amount that is finally determined by the step S12 of FIG. 8 maybe taken as being the employed defocus amount the previous time.

In a step S104, the body control device 19 decides whether or not the difference between the defocus amount for the center area within the tracking region that was compared in the step S103 and the employed defocus amount the previous time is within a predetermined value. If the difference between these defocus amounts is within the predetermined value, then the flow of control proceeds to a step S105, and in this step S105 the defocus amount for the center area within the tracking region that was calculated in the step S102 is confirmed as being the defocus amount that is to be employed at this time. In other words, in the example described above, the defocus amount D[g] is taken as the employed defocus amount this time. When the step S105 has been executed, the body control device 19 terminates this second stage focus detection calculation processing and the flow of control is transferred to the step S72 of the FIG. 11 flow chart. On the other hand, if the difference between the defocus amount for the center area within the tracking region that was compared in the step S103 and the employed defocus amount the previous time is greater than or equal to the predetermined value, then the flow of control is transferred to a step S106.

In this step S106, the body control device 19 acquires from the range-finding element 10 the focus detection signals for those focus detection areas, among the focus detection areas 45a through 45k, that are within the tracking region that has been specified by the image tracking calculation of the step S70 and that are positioned adjacent thereto, and calculates their defocus amounts. For example, for the tracking region 49 of FIG. 7B, for the adjacent focus detection areas 45c, 45h, and 45k, the focus detection signals are acquired from the range-finding element 10, and their defocus amounts D[c], D[h], and D[k] are calculated. It should be understood that, since the defocus amount D[g] for the focus detection area 45g that is closest to the center of the tracking region has already been calculated in the step S102, here it is excluded from the subjects for calculation.

In a step S107, the body control device 19 selects that defocus amount, among the defocus amounts that have been calculated in the step S106, for which the difference with the employed defocus amount the previous time is the smallest. For example, in the example described above, among the defocus amounts D[c], D[h], and D[k] that have been calculated, if the defocus amount D[k] is the one whose difference from the employed defocus amount the previous time is the smallest, then that defocus amount D[k] is selected.

In a step S108, the body control device 19 makes a decision as to whether or not the difference between the defocus amount that was selected in the step S107 and the employed defocus amount the previous time is within a predetermined value. If the difference between these defocus amounts is within the predetermined value, then the flow of control proceeds to a step S109, and in this step S109 the defocus amount that was selected in the step S107 is confirmed as being the employed defocus amount to be used this time. In other words, in the example described above, the defocus amount D[k] is taken as being the defocus amount to be employed this time. When the step S109 has been executed, the body control device 19 terminates this second stage focus detection calculation processing and the flow of control is transferred to the step S72 of the FIG. 11 flow chart. On the other hand, if the difference between the defocus amount that was selected in the step S107 and the employed defocus amount the previous time is greater than or equal to the predetermined value, then the flow of control is transferred to a step S110.

In this step S110, the body control device 19 acquires from the range-finding element 10 the focus detection signals for that focus detection area, among the focus detection areas 45a through 45k, that was the employed area the previous time, in other words that is the focus detection area for which the employed defocus amount was detected the previous time, and for those areas that are positioned adjacent thereto, and calculates their defocus amounts. For example, if the employed area the previous time is supposed to be the focus detection area 45a of FIG. 7B, then its defocus amount D[a] and the defocus amounts D[b], D[d], D[e], and D[f] for the focus detection areas 45b, 45d, 45e, and 45f that are adjacent to this focus detection area 45a are calculated.

In a step S111, the body control device 19 selects, among the defocus amounts that have been calculated in the step S110, that one whose difference from the defocus amount that was employed the previous time is the smallest. For example, in the example above, among the defocus amounts D[b], D[d], D[e], and D[f] that have been calculated, if the defocus amount D[f] is the one whose difference from the defocus amount employed the previous time is the smallest, then that defocus amount D[f] is selected.

In a step S112, the body control device 19 makes a decision as to whether or not the difference between the defocus amount that was selected in the step S111 and the employed defocus amount the previous time is within a predetermined value. If the difference between these defocus amounts is within the predetermined value, then the flow of control proceeds to a step S113, and in this step S113 the defocus amount that was selected in the step S111 is confirmed as being the employed defocus amount to be used this time. In other words, in the example described above, the defocus amount D[f] is taken as being the defocus amount to be employed this time. When the step S113 has been executed, the body control device 19 terminates this second stage focus detection calculation processing and the flow of control is transferred to the step S72 of the FIG. 11 flow chart.

On the other hand, if the difference between the defocus amount that was selected in the step S111 and the employed defocus amount the previous time is greater than or equal to the predetermined value, then the flow of control is transferred to a step S114. In this step S114 the body control device 19 considers that, this time, it has not been possible to detect any effective defocus amount, and accordingly it does not confirm any of the defocus amounts that have been calculated as being the defocus amount to be employed, and does not employ any defocus amount. When the step S114 has been executed, the body control device 19 terminates this second stage focus detection calculation processing and the flow of control is transferred to the step S72 of the FIG. 11 flow chart. In this case, drive control of the focusing lens 8b is not performed by the focus adjustment control of the step S72, and accordingly the focus adjustment state of the photographic lens 8 is not changed.

It should be understood that if the defocus amount that was taken as the subject of calculation in the step S102, the step S106, or the step S110 described above has already been calculated in the first stage focus detection calculation processing that was executed in the step S67 of the FIG. 11 flow chart, then the calculation of its defocus amount in the step S102, the step S106, or the step S110 is omitted. Due to this, the body control device 19 prohibits the execution of the second stage focus detection calculation processing and the detection of the focus adjustment state of the photographic lens 8 for any focus detection area whose defocus amount has been obtained during the first stage focus detection calculation processing.

By the second stage focus detection calculation processing such as explained above being executed in the step S71 of the FIG. 11 flow chart, the defocus amount is detected for the focus detection area corresponding to the position of the image that corresponds to the reference information recognized by the image tracking calculation of the step S70, and thereby the employed defocus amount that is to be used for focus adjustment this time is determined. By performing the focus adjustment control of the step S72 based upon this defocus amount to be employed, during sequential shooting, the focus adjustment state of the photographic lens 8 is changed in an appropriate manner according to the movement of the photographic subject.

According to the embodiment explained above, the following beneficial operational effects are obtained.

(1) With the camera 1 of this embodiment, the second stage image sensor 16 takes an image created by the photographic lens 8, and outputs image information therefor. And the body control device 19 obtains a defocus amount that specifies the focusing state of the photographic lens 8 based upon the focus detection signal from the range-finding element 10. Moreover, the body control device 19, along with storing the template image information 48 as reference information related to the image that is to be taken as a reference, also, by performing the image tracking calculation, recognizes the position of an image corresponding to the reference information in an image to be tracked that corresponds to image information outputted from the second image sensor 16. Furthermore, along with it being arranged for the body control device 19 to perform the first stage focus detection calculation processing in the step S67 and to obtain the defocus amount before executing the image tracking calculation in the step S70 and recognizing the above described position of the image, it is arranged for the body control device 19 also to perform the second stage focus detection calculation processing of the step S71 for the above described position of the image that has been recognized by executing the image tracking calculation in the step S70, thus obtaining the defocus amount. Since this is done, as much defocus amount calculation is performed as possible before executing the image tracking calculation, so that it is possible to reduce the amount of defocus amount calculation that is performed after the execution of the image tracking calculation. Accordingly, it is possible to perform efficient control within the time period available for calculation processing, that is limited.

(2) The body control device 19 detects the defocus amounts for the plurality of focus detection areas 45a through 45k that have been set for the plurality of positions upon the image surface of the photographic lens 8. Moreover, in the second stage focus detection calculation processing that is performed in the step S71, it is arranged for the body control device 19 to obtain (in the steps S102 and S106) the defocus amounts for those focus detection areas, among the plurality of focus detection areas 45a through 45k, that belong to the region corresponding to the position of the image that was recognized by the image tracking calculation in the step S70. Since this is done, it is possible quickly to detect the defocus amount for performing focus adjustment, according to the movement of the photographic subject that has been determined as being the subject for tracking.

(3) In the first stage focus detection processing that is performed in the step S67, it is arranged for the body control device 19 to obtain the defocus amounts for the focus detection areas, among the plurality of focus detection areas 45a through 45k, that were selected in advance as being the area that was employed the previous time, and the areas adjacent thereto. Since this is done, it is possible, even before performing the tracking subject calculation, to detect the defocus amounts for a region in which the possibility is high that the photographic subject, that has been determined as being the subject for tracking, is present.

(4) It is arranged for the body control device 19 to prohibit (in the step S102 or the step S106) obtaining of the defocus amounts for those focus detection areas, among the plurality of focus detection areas 45a through 45k, for which the defocus amounts have already been obtained during the first stage focus detection calculation processing of the step S67. Since this is done, it is possible to shorten the calculation processing time period by omitting unnecessary calculation of the defocus amounts.

(5) The body control device 19 decides (in the step S101) whether or not it has been possible to specify, by the image tracking calculation of the step S70, a tracking region that corresponds to the reference information. If it has not been possible to specify the tracking region, and it has not been possible to recognize the position of the reference information for the image to be tracked, then it is arranged to prohibit the execution of the second stage focus detection calculation processing of the step S101 and subsequently, and to prohibit the detection of the focus adjustment state of the photographic lens 8. Since this is done, it is possible to omit useless calculation of the defocus amounts and to shorten the calculation processing time period, if a failure has occurred in the image tracking.

(6) It is possible for the body control device 19 selectively to set either the tracking priority mode or the selected area priority mode. In the tracking priority mode, by executing the second stage focus detection calculation processing in the step S71, a defocus amount that corresponds to the position of the subject image that has been recognized by the image tracking calculation of the step S70 is employed as a priority over the defocus amounts that were detected by the first stage focus detection calculation processing of the step S67 (in the step S105 and the step S109). On the other hand, in the selected area priority mode, by executing the selected area priority focus detection calculation processing in the step S58, among the plurality of focus detection areas 45a through 45k, the defocus amount for the user selected area or for an area that is adjacent thereto is employed (in the step S84 or the step S88). At this time, it is arranged not to calculate any defocus amounts after the image tracking calculation of the step S64. Since this is done, it is possible to set either of these modes and it is possible to perform focus adjustment control in an appropriate manner, according to the usage style of the user.

(7) The body control device 19 performs focus adjustment of the photographic lens 8 based upon the defocus amount that has been obtained based upon the focus detection signal from the range-finding element 10. In particular, during sequential shooting in which image taking by the first image sensor 4 is repeated a plurality of times, it is arranged to perform the first stage focus detection calculation processing of the step S67 and the second stage focus detection calculation of the step S71 repeatedly at the same interval between the time periods at which the image taking is performed. Since this is done, it is possible to perform focus adjustment of the photographic lens 8 in an appropriate manner within the limited calculation time period that is available.

It should be understood that, although in the embodiment described above an example was described in which the focus detection was performed using the independent range-finding element 10, it would also be acceptable to provide an arrangement in which pixels for focus detection are intermingled into the image capture pixel array of the first image sensor 4 and receive a pair of ray bundles that have passed through different portions of the pupil of the photographic lens, and to obtain the focus adjustment state by using the output of these pixels for focus detection. Furthermore, instead of the second image sensor, it would also be acceptable to perform tracking and photometry using the output of this first image sensor.

What is claimed is:

1. An image tracking device, comprising:
   an image pickup device that repeatedly takes a photographic subject image which is formed by an optical system and outputs images;
   a defocus amount calculation device that repeatedly calculates defocus amounts for a plurality of focus detection areas that are set within a photographic scene by the optical system;
   a tracking subject setting device that sets a photographic subject region as a tracking subject image which is positioned at one of the focus detection areas in a first image output by the image pickup device;
   a tracking device that detects a position of the tracking subject image in a second image output by the image pickup device by comparing a reference image, which is image information relating to the tracking subject image set by the tracking subject setting device with image information of the second image output by the image pickup device;
   a defocus amount determination device that determines a second defocus amount as an employed defocus amount, if a first difference, between a first defocus amount for the focus detection area positioned at the tracking subject image which was set by the tracking subject setting device and the second defocus amount for the focus detection area positioned at the tracking subject image within the second image, which was detected by the tracking device, is within a predetermined value or less; and
   a focus adjustment device that performs a focus adjustment of the optical system based upon the employed defocus amount, wherein
   if the first difference is greater than or equal to the predetermined value,
   the defocus amount determination device,
      selects one defocus amount as a third defocus amount among the defocus amounts for focus detection areas positioned at peripheral areas to the focus detection area for which the second defocus amount was detected, which has the smallest difference from the first defocus amount as a second difference; and
      determines the third defocus amount as an employed defocus amount if the second difference is within the predetermined value or less.

2. The image tracking device according to claim 1, wherein, if the second difference is greater than or equal to the predetermined value, the defocus amount determination device:
   selects one defocus amount as a fourth defocus amount, among the defocus amounts for focus detection areas positioned at peripheral areas to the focus detection area for which the first defocus amount was detected, which has a smallest difference from the first defocus amount as a third difference; and
   determines the fourth defocus amount as the employed defocus amount if the third difference is within the predetermined value or less.

3. The image tracking device according to claim 1, further comprising a defocus amount storing device that repeatedly stores the defocus amounts calculated by the defocus amount calculation device, wherein
   the defocus amount storing device stores the defocus amounts for the focus detection areas positioned at peripheral areas of the focus detection area for which the first defocus amount was detected, prior to detecting a position of the tracking subject image in the second image by the tracking device.

4. The image tracking device according to claim 3, further comprising a calculation excluding device that excludes calculation of a defocus amount, among a plurality of defocus amounts for the focus detection areas positioned at a peripheral areas of the focus detection area for which the third defocus amount was detected, which was already stored in the defocus amount storing device.

5. An imaging device, comprising:
   an imaging device that performs photometry of a photographing subject and outputs a resulting information;
   a recognition device that recognizes a photographic subject region by performing an image tracking calculation based upon image information;
   a selecting device that selects at least one focus detection area among a plurality of focus detection areas for detecting a focusing state of an optical system;
   a calculation device that performs a first calculation for detection of the focusing state of the optical system based upon a defocus amount for the focus detection area that has been selected by the selecting device;
   a control device that performs a focus adjustment of the optical system based upon output from the calculation device; and
   an obtaining device that obtains information of a position of the focus detection area that has been used for the focus adjustment of the optical system, wherein
   the selecting device, in a period between a first shooting and a second shooting during sequential shooting, selects the focus detection area corresponding to the position of the focus detection area, obtained by the obtaining device, that has been used for the focus adjustment of the optical system, before selecting the focus detection area corresponding to the photographic subject region which was recognized by the recognition device by performing an image tracking calculation based upon the image information, and
   the calculation device, in the period between the first shooting and the second shooting during sequential shooting, performs the first calculation for detection of the defocus amount of the optical system for the focus detection area that has been used for the focus adjustment of the optical system, before performing a second calculation for detection of the defocus amount of the optical system for the focus detection area corresponding to the photographic subject region which was recognized by the recognition device by performing an image tracking calculation based upon the image information.

6. The imaging device according to claim 5, wherein
   the focus detection device, in the period between the first shooting and the second shooting during the sequential shooting, detects the focusing state of the optical system based upon the defocus amount for the focus detection area included in a region which corresponds to the position of the focus detection area obtained by the obtaining device that has been used for drive control of the optical system, and then detects the focusing state of the optical system based upon the defocus amount for the focus detection area included in a region that corresponds to the photographic subject region.

7. The imaging device according to claim 6, wherein the focus detection device, in the period between the first shooting and the second shooting during the sequential shooting, detects the focusing state of the optical system based upon the defocus amount for the focus detection area included in a region which is corresponding to the position of the focus detection area obtained by the obtaining device that has been used for drive control of the optical system, and after the recognition device recognizes the photographic subject region by performing the image tracking calculation based upon the image information, detects the focusing state of the optical system based upon the defocus amount for the focus detection area included in the region which is corresponding to the photographic subject region.

8. The imaging device according to claim 5, wherein if the defocus amount for the focus detection area included in the region which is corresponding to the photographic subject region is not within a predetermined range, the selecting device selects the focus detection area obtained by the obtaining device that has been used for drive control of the optical system.

9. The imaging device according to claim 5, wherein the focus detection area, obtained by the obtaining device which corresponds to the position of the focus detection area that has been used for the focus adjustment of the optical system, includes the focus detection area that has been used for drive control of the optical system and the focus detection areas positioned at peripheral areas to the focus detection area that has been used for drive control of the optical system, and the focus detection area which corresponds to the photographic subject region includes focus detection areas within the photographic subject region and focus detection areas positioned at peripheral areas to the photographic subject region.

10. The imaging device according to claim 5, wherein, the selecting device, in the period between the first shooting and the second shooting during sequential shooting, selects the focus detection area corresponding to the position of the focus detection area, obtained by the obtaining device, that has been used for the focus adjustment of the optical system by the control device, before the recognition device recognizes a photographic subject region, and selects the focus detection area which is corresponding to the photographic subject region recognized by the recognition device, after the recognition device recognizes the photographic subject region.

11. The imaging device according to claim 5, further comprising:

a photographic subject imaging for recording device that outputs an image of a photographic subject for recording, wherein the imaging device outputs the image information other than the image of the photographic subject for recording.

12. The imaging device according to claim 5, further comprising:

a storing device that stores a template image, wherein the imaging device outputs a first image information corresponding to a first image and then outputs a second image information corresponding to a second image, the storing device stores an image of a portion corresponding to a tracking subject in the first image information as the template image, and the recognition device recognizes the photographic subject region by performing the image tracking calculation for obtaining the position corresponding to the template image in the second image information based upon a template matching with the template image.

13. An image tracking device, comprising:

an imaging device that outputs a first image information corresponding to a first image and then outputs a second image information corresponding to a second image, a defocus amount calculation device that repeatedly calculates defocus amounts for a plurality of focus detection areas that are set within a photographic scene by the optical system, a tracking subject setting device that sets an image of a portion corresponding to a tracking subject in the first image information as a first tracking subject image, a tracking device that detects a second tracking subject image, corresponding to the first tracking subject image, included in the second image information, by comparing a reference information corresponding to the first tracking subject image with the second image information output by the imaging device, and a defocus amount determination device that determines an employed defocus amount, wherein if a first difference, between a first defocus amount that is the defocus amount for the focus detection area corresponding to the position of the first tracking subject image in the first image information and a second defocus amount that is the defocus amount for the focus detection area corresponding to the position of the second tracking subject image in the second information, is smaller than a first predetermined value, the defocus amount determination device determines that the second defocus amount is to be the employed defocus amount, and if the first difference is greater than or equal to the first predetermined value, the defocus amount determination device calculates a plurality of difference between the first defocus amount and the defocus amount for focus detection areas that are positioned peripheral to the focus detection area from which the second defocus amount were obtained, and selects one defocus amount as a third defocus amount among the defocus amounts for focus detection areas positioned at peripheral areas to the focus detection area for which the second defocus amount was detected, which has the smallest difference from the first defocus amount as a second difference, and if the second difference is smaller than a second predetermined value, the defocus amount determination device determines that the third defocus amount is to be the employed defocus amount.

* * * * *